United States Patent [19]

Rosemund et al.

[11] 4,038,210
[45] July 26, 1977

[54] BETA-AMINO NITRILE CATALYSTS FOR POLYURETHANE PREPARATION

[75] Inventors: Walter Richard Rosemund, Englewood, N.J.; Michael Ray Sandner, Charleston; David John Trecker, South Charleston, both of W. Va.

[73] Assignee: Union Carbide Corporation, New York, N.Y.

[21] Appl. No.: 596,628

[22] Filed: July 17, 1975

Related U.S. Application Data

[60] Division of Ser. No. 369,556, June 13, 1973, Pat. No. 3,925,268, which is a continuation-in-part of Ser. No. 353,512, April 23, 1973, abandoned.

[51] Int. Cl.² .............................................. B01J 31/02
[52] U.S. Cl. .............................. 252/426; 260/2.5 AC; 260/75 NC; 260/77.5 AC
[58] Field of Search ... 260/2.5 AC, 75 NC, 77.5 AC; 252/426

[56] References Cited

U.S. PATENT DOCUMENTS

| 3,821,131 | 6/1974 | Priest et al. ................. 260/77.5 AC |
| 3,836,488 | 9/1974 | Pruitt et al. .................... 260/2.5 AC |

FOREIGN PATENT DOCUMENTS

| 214,810 | 5/1957 | Australia ............................. 252/426 |
| 879,169 | 10/1961 | United Kingdom ........ 260/77.5 AC |

*Primary Examiner*—Patrick P. Garvin
*Attorney, Agent, or Firm*—Marylin Klosty

[57] ABSTRACT

Cellular urethane polymers essentially free of the strong, objectionable amine odor characteristic of N-ethylmorpholine, are provided by effecting the polyurethane forming reaction in the presence of beta-tertamino nitriles. In view of their low residual odor and effectiveness in the catalysis of the water-isocyanate reaction, the beta-amino nitriles either alone or in combination with other tertiary amines, are used with particular advantage as direct replacements for N-ethylmorpholine in the manufacture of water-blown flexible polyurethanes, both molded and free-rise, including high-resilience foam as well as foams stabilized with either organosilicone or silicon-free organic surfactants. Especially effective for the formation of flexible polyester foam stabilized with either type of surfactant are blends of the beta-amino nitrile catalyst such as, in particular, 3-(N,N-dimethylamino)propionitrile, with dimethylethanolamine or a bis[2-(N,N-dimethylamino)alkyl]-ether.

4 Claims, No Drawings

BETA-AMINO NITRILE CATALYSTS FOR POLYURETHANE PREPARATION

This is a division of application Serial No. 369,556, filed June 13, 1973, now U.S. Pat. No. 3,925,268, granted Dec. 9, 1975. The said application Ser. No. 369,556 in turn is a continuation-in-part of application Ser. No. 353,212, filed Apr. 23, 1973, now abandoned.

BACKGROUND OF THE INVENTION

This invention pertains to particular cyanosubstituted tertiary amines as catalysts for the formation of urethane polymers by the reaction of organic isocyanates with active hydrogen-containing compounds.

It is well known to the art that urethane polymers are provided by the reaction of organic polyisocyanates and active hydrogen-containing organic compounds, usually in the presence of one or more activators, and that blowing action is provided when cellular products including flexible, semi-flexible and rigid foams, are desired. It is also known that a number of different chemical reactions occur during polymer formation and expansion. For example, in addition to the chain-extending, urethane-forming reaction between free isocyanate groups and active hydrogen, initially formed urethane linkages bearing secondary hydrogen may also function as a source of active hydrogen and react with additional isocyanate to form cross-links between polymer chains. Further, in water-containing systems such as those employed for the manufacture of flexible foams, isocyanate is also consumed by reaction with water, thereby generating carbon dioxide blowing agent in situ and introducing urea groups. The nature of the cellular structure and the physical and mechanical properties of the foam are influenced by the extent of such reactions, and the relative rates and point in time at which they occur. Although balancing these variables so as to achieve a particular type or grade of foam can be controlled to some extent by the functionality, molecular weight and other structural features of the polyisocyanate and active hydrogen-containing reactants, the catalyst system also plays a significant role in this respect.

Among the relatively few compounds that have achieved widespread commercial application as catalysts in polyurethane manufacture are: tertiary amines consisting of carbon, hydrogen and nitrogen, as typically illustrated by 1,4-diazabicyclo[2.2.2]octane ("triethylenediamine") and N,N,N',N'-tetramethyl-1,3-butanediamine; and tertiary amines consisting of carbon, hydrogen, nitrogen and oxygen wherein oxygen is present as ether oxygen, as typically illustrated by bis[2-(N,N-dimethylamino)ethyl]ether and N-ethylmorpholine.

A relatively recent advance in the area of flexible polyurethane foam technology which has triggered intensive research effort to develop improved activators, is the advent of reaction mixtures having a sufficiently high reactivity to provide more complete reactions during polymer formation and expansion, thereby eliminating the need in commercial practice to post-cure the foam at high temperatures (300°–500° F.) to obtain a product of satisfactory overall properties. In addition to the saving in cost which elimination of high temperature post-curing offers to the foam manufacturer, such highly reactive formulations also provide flexible foams of generally improved flammability characteristics, more linear and thus improved load/deflection properties, low flex fatigue, and greater resiliency. In view of this latter characteristic, such products are referred to generally as high-resilience foams. In view of the aforesaid combination of properties, high-resilience foam is particularly suited as cushioning material in automotive interiors. In the production of at least a substantial proportion of highresilience foam being manufactured at the present time, the aforementioned N-ethylmorpholine is used as a major component of mixed catalyst systems.

With respect to flexible polyurethane foam manufacture generally, it is often the preferred practice of foam manufacturers to premix the amine catalyst(s), water and foam stabilizer(s) and to feed the aqueous premixture, commonly referred to as the activator stream, to the foam formulation as a single stream. It is often observed, however, that the mere mixing of the amine and foam stabilizing components in water forms a highly viscous mixture which detracts from the processing advantage of adding these components as a combined stream rather than as individual streams. This problem is encountered in particular in the manufacture of polyester polyol-based polyurethanes in which silicon-free organic surfactants are used to stabilize the foam. Thus, when certain otherwise catalytically effective amine catalysts such as bis-[2-(N,N-dimethylamino)ethyl]ether, are present in combination with organic foam stabilizers, the activator stream becomes extremely viscous, approaching or actually undergoing gellation, thereby hampering or preventing pumping. In this respect, N-ethylmorpholine is also used with advantage in the manufacture of polyester-polyol based foams in that it is suitably employed as an amine component of aqueous activator streams containing organosilicone or silicon-free organic foam stabilizers.

The usefulness of N-ethylmorpholine in the manufacture of cellular urethanes, however, is attended with certain disadvantages. Thus, N-ethylmorpholine suffers the very serious drawback of having a particularly strong amine odor. The large quantities of N-ethylmorpholine which are employed relative to other catalyst components of the foam formulation causes an obnoxious atmosphere at and surrounding the foam manufacturing plant site and also provides foams having a strong residual amine odor. This compound is also associated with a number of serious toxic effects; see, for example, *Plastics Technology*, "Catalysts Improve As Their Need Increases" pages 47–49 (July 1972). Consequently, it is desirable and is a primary objective of this invention to provide a direct replacement for N-ethylmorpholine in the production of cellular polyurethanes and thereby allow for at least a substantial reduction in the relatively large amounts presently employed. Various other objects and advantages of the present invention will become apparent from the accompanying description and disclosure.

SUMMARY OF THE INVENTION

In accordance with the teachings of the present invention, cellular polyurethanes are provided by effecting reaction of active hydrogen-containing compounds and polyisocyanates in the presence of a particular class of beta-amino nitriles as catalytic components of the urethaneforming reaction mixture. The structural characteristic common to each of the beta-amino nitrile catalysts employed in the practice of the invention is a tertiary amino nitrogen atom to which a 2-cyanoalkyl group is bonded, as shown,

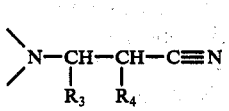

where $R_3$ and $R_4$ independently represent hydrogen or a lower alkyl group. The indicated tertiary nitrogen atom can be acyclic or a member of a heterocyclic nucleus which may contain additional hereto atoms such as oxygen and a second nitrogen atom. Overall, the beta-amino nitrile catalysts employed as described herein contain from 5 to 33 carbon atoms, no individual continuous carbon chain having more than 11 carbon atoms. Except for cyano nitrogen, all remaining atoms are joined through single bonds.

The structural characteristics of the beta-amino nitriles employed as described herein are conveniently expressed by the following general Formula I:

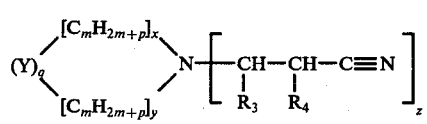

wherein, and as defined for the purpose of the entire specification:

Y is an oxygen or nitrogen atom and, when Y is nitrogen, the remaining valence thereof is satisfied by a bond to R° which is a lower alkyl radical ($R_1$) or a second —CH($R_3$)CH($R_4$)CN group;

$R_3$ and $R_4$ each represents hydrogen or a lower alkyl group and may be the same as or different from one another;

x, y, p and q independently have values of zero or one, provided that when q is one, x and y are also one and, when x or y is zero, q is also zero;

p+q has a value of one;

m has a value of from 1 to 4, provided that when q is one, m is two; and z has a value of from one to three, provided the sum x+y+z is three.

It is to be understood that the expression "lower alkyl" as used herein including the claims, denotes an alkyl radical having from one to four carbon atoms including linear and branched radicals (that is, radicals of the series, $C_mH_{2m+p}$, wherein m is a integer from 1 to 4 and p is one).

It has been discovered that the above-described beta-amino nitriles are useful as catalytic components in the manufacture of a wide variety of cellular urethanes. They are effective activators when used as the sole nitrogenbearing catalytic components of foam formulations, although their employment in combination with other tertiary amines is within the scope of the present invention. Effective in catalyzing the water-isocyanate reaction, these betaamino nitriles are used with particular advantage in the manufacture of water-blown flexible foams, both molded and free-rise, including high-resilience foam. It also has been discovered that, in addition to their usefulness as catalytic components of foam formulations containing silicone surfactants, the beta-amino nitriles offer the further advantage of providing liquid, easily pumped activator streams containing silicon-free organic foam-stabilizing components of polyester polyol-based formulations. In addition to their versatility in the aforesaid respects, they have the further highly desirable characteristic of low residual odor and thus allow for the formation of foam products essentially free of the post-cure odor associated with N-ethyl-morpholine.

The present invention also relates to particular blends of the beta-amino nitrile catalysts with other tertiary amines such as, for example, dimethylethanolamine and a bis[2-(N,N-dimethylamino)-alkyl]ether, the use of such blends as mixed amine catalyst systems for cellular urethane formation, and to the cellular urethane polymers produced in the presence of the catalysts described herein.

DETAILED DESCRIPTION OF THE INVENTION AND PREFERRED EMBODIMENTS

A. The Beta-Amino Nitrile Catalysts

In generic Formula I, the sum p+q is one and thus when q is zero, p has a value of one, and the resulting catalysts are the acyclic monoamines encompassed by the following Formula II:

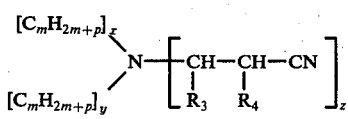

As shown, these acyclic compounds have from one to three 2-cyanoalkyl groups and correspondingly from two to zero lower alkyls bonded to the teritary nitrogen atom, depending on the respective values of x, y and z. These more specific beta-amino nitriles are shown by the following Formulas II-A to II-C where, for convenience, the lower alkyl groups represented by each $C_mH_{2m+p}$- group are shown as $R_1$ and $R_2$:

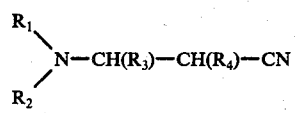

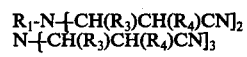 

General Formula I also encompasses compounds wherein the indicated tertiary amino nitrogen atom is a member of a morpholine or 1,4-piperazine nucleus. Such catalysts for use in the practice of this invention are depicted by the following Formulas III and IV, respectively:

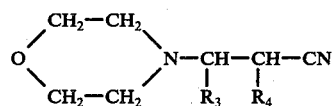

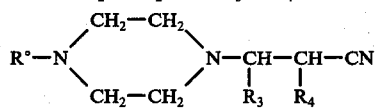

wherein R° is a lower alkyl group ($R_1$) or a second 2-cyanoalkyl group [—CH($R_3$)CH($R_4$)CN].

It is to be understood that the lower alkyls represented by $R_1$ and $R_2$ and encompassed by $R_3$ and $R_4$ may be the same as or different form one another. The generally preferred beta-amino nitriles for use in the practice of the invention are those compounds wherein at least one of $R_3$ and $R_4$ of any individual 2-cyanoalkyl group is hydrogen, and the other is either hydrogen, methyl or ethyl, and wherein $R_1$ and $R_2$, when present, are independently methyl or ethyl. Most preferred are the catalysts encompassed by Formulas I-IV wherein $R_3$ and $R_4$ are both hydrogen.

Typical examples of suitable catalysts for use in the formation of cellular urethane polymers in accordance with the teachings of this invention are the following compounds:
3-(N,N-dimethylamino)propionitrile;
3-(N,N-diethylamino)propionitrile;
3-(N-methyl-N-ethylamino)propionitrile;
3-(N-methyl-N-n-propylamino)propionitrile;
3-(N,N-di-n-propylamino)propionitrile;
3-(N,N-diisopropylamino)propionitrile;
3-(N-methyl-N-isopropylamino)propionitrile;
3-(N-methyl-N-isobutylamino)propionitrile;
3-(N-ethyl-N-isopropylamino)propionitrile;
3-(N-n-propyl-N-n-butylamino)propionitrile;
3-(N,N-di-n-butylamino)propionitrile;
3-(N,N-dimethylamino)-3-methylpropionitrile;
3-(N,N-diethylamino)-3-methylpropionitrile;
3-(N,N-di-n-propylamino)-3-methylpropionitrile;
3-(N,N-dimethylamino)-3-ethylpropionitrile;
3-(N,N-dimethylamino)-3-propylpropionitrile;
3-(N,N-dimethylamino)-3-butylpropionitrile;
3-(N,N-dimethylamino)-2-methylpropionitrile;
3-(N,N-dimethylamino)-2-ethylpropionitrile;
3-(N,N-diethylamino)-2-methylpropionitrile;
N,N-di(2-cyanoethyl)-N-methylamine;
N,N-di(2-cyanoethyl)-N-ethylamine;
N,N,N-tri(2-cyanoethyl)amine;
3-(4-morpholino)propionitrile;
3-(4-morpholino)-2-methylpropionitrile;
1,4-piperazinedipropionitrile; and
3-(4-N-methylpiperazine)propionitrile.

The above-described beta-amino nitriles employed as catalytic components of polyurethane-forming reaction mixtures as described herein are prepared by a number of different types of reactions which are known to the art. Generally, these methods comprise the reaction of (A) a secondary amine and (B) an alpha,beta-unsaturated nitrile, a beta-cyanohydrin, a beta-alkoxynitrile or a betahalonitrile. Equation 1 below encompasses these various reactions as applied to the preparation of the catalysts having one 2-cyanoalkyl group bonded to tertiary nitrogen, that is, those compounds of Formula I wherein each of $x$, $y$ and $z$ is one.

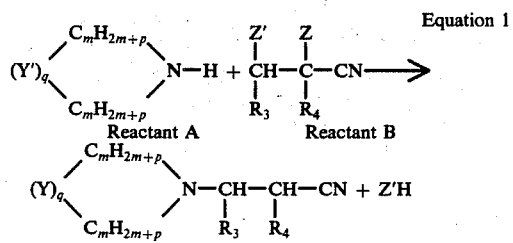

Equation 1

In Equation 1: Y' is oxygen or a second nitrogen atom to which either a lower alkyl group ($R_1$) or hydrogen is bonded; Z and Z', taken together, represent a second bond between the adjacent carbon atoms, and when taken individually, Z is hydrogen and Z' is hydroxyl, alkoxy ($R_5O$—) or halogen (X); and, as previously defined with respect to Formula I, Y is oxygen or a second nitrogen atom to which a lower alkyl ($R_1$) or —CH($R_3$)CH($R_4$)CN group is bonded, $R_3$ and $R_4$ are either hydrogen or lower alkyl, $q$ and $p$ are either zero or one, the sum $p+q$ being one, and $m$ is from one to four, provided $m$ is two when $q$ is one.

Equation 2 below encompasses the various reactions for preparing the beta-amino nitriles having two or three 2-cyanoalkyl groups and correspondingly one or zero lower alkyl groups ($R_1$) bonded to tertiary nitrogen, that is, those compounds of Formula I wherein $y$ is zero, $x$ is zero or one and $z$ is 2 or 3, the sum $x+z$ being three.

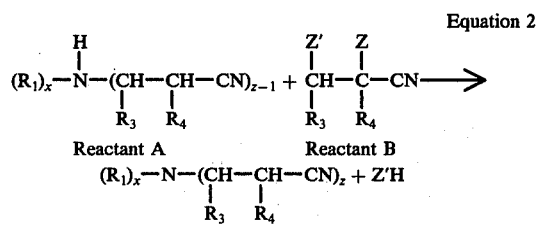

Equation 2

Suitable classes of secondary amines for use as Reactant A in Equations 1 and 2 are: the di(lower)alkylamines [($R_1$)($R_2$)NH] as typically illustrated by dimethylamine, diethylamine, di-n-propylamine, diisopropylamine, di-n-butylamine, methylethylamine, methyl-n-propylamine, methylisopropylamine, methylisobutylamine, methyl-n-butylamine, methyl-sec-butylamine, ethylisopropylamine, isopropyl-n-propylamine and ethylisobutylamine; the saturated heterocyclic secondary amines specifically illustrated by morpholine, piperazine, 4-N-methylpiperazine and 4-N-ethylpiperazine; and 2-cyanoalkyl substituted secondary amines such as N-methyl-N-(2-cyanoethyl)amine, N-ethyl-N-(2-cyanoethyl)amine and di-N,N-(2-cyanoethyl)amine.

Illustrative of suitable compounds encompassed by the definition of Reactant B of Equations 1 and 2 are: (1) alpha,beta-unsaturated nitriles [CH($R_3$)=C($R_4$)—CN] such as acrylonitrile, methacrylonitrile, crotononitrile, 2-methyl-2-butenenitrile, 2-pentenenitrile, 2-ethylpropenenitrile, 2-hexenenitrile, 2-n-propylpropenenitrile and 2-heptenenitrile; (2) beta-cyanohydrins [HO—CH($R_3$)—CH($R_4$)—CN] such as ethylene cyanohydrin and 3-hydroxybutyronitrile; (3) beta-alkoxypropionitriles [$R_5$O—CH($R_3$)CH($R_3$)CH($R_4$)—CN] such as 3-methoxypropionitrile and 3-ethoxypropionitrile; and (4) beta-halonitriles [X-CH($R_3$)—CH($R_4$)—CN where X is bromine or chlorine] such as 3-chloropropionitrile, 3-bromopropionitrile, 3-chlorobutyronitrile, 3-chloro-2-methylpropionitrile and 3-bromo-2-methylpropionitrile.

When Reactant B of Equations 1 and 2 is an alpha,beta-unsaturated nitrile, the beta-amino nitriles are formed by the direct addition of the reactive

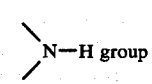

(or groups as in piperazine) across the ethylenic site of unsaturation. The cyanoalkylation reactions encompassed by Equation 1 provide the corresponding 2- and/or 3-(lower)alkyl substituted or unsubstituted 3-[N,N-di(lower)alkylamino]propionitriles, 3-(4-morpholino)propionitriles, 3-[4-N-(lower)alkylpiperazine]propionitriles and di-3-(1,4-piperazine)propionitriles, as shown by the following Equations 3-6, respectively:

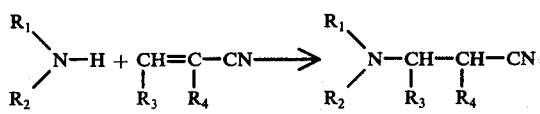

(3)

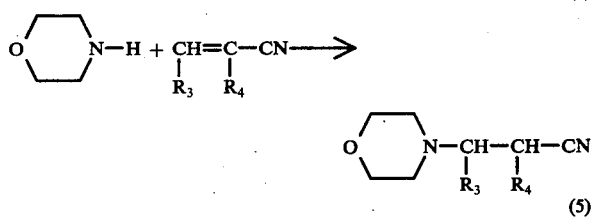

(4)

(5)

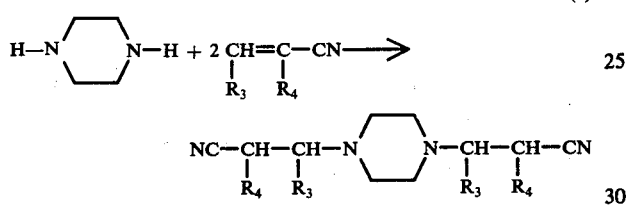

(6)

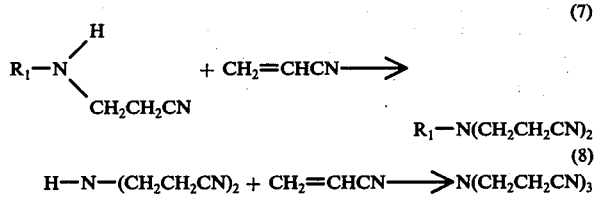

When each of $R_3$ and $R_4$ is hydrogen, the unsaturated nitrile reactant is, of course, acrylonitrile and the reactions comprise cyanoethylation of the indicated secondary amines to provide the corresponding unsubstituted 3-tert-aminopropionitriles. When $R_3$ and/or $R_4$ are lower alkyls, the products are the corresponding 2- and/or 3-(lower)alkyl substituted 3-tert-aminopropionitriles.

When Reactant B of Equation 2 is an alpha, beta-unsaturated nitrile, secondary amine Reactant A is cyanoalkylated to provide the corresponding di- and tri-(2-cyanoalkyl)amines, as illustrated by Equations 7 and 8 below wherein, for convenience, each $R_3$ and $R_4$ group is shown as hydrogen.

(7)

$$R_1-N\begin{matrix}H\\ \\CH_2CH_2CN\end{matrix} + CH_2=CHCN \longrightarrow$$

$$R_1-N(CH_2CH_2CN)_2$$

(8)

$$H-N-(CH_2CH_2CN)_2 + CH_2=CHCN \longrightarrow N(CH_2CH_2CN)_3$$

Generally, the addition or cyanoalkylation reactions encompassed by Equations 1 and 2 and to which Equations 3-8 are specifically drawn, are carried out over a wide range of temperatures such as from minus 15° C. to about 200° C. Within this range, temperatures up to about 100° C. are suitable for the reactions of Equations 3-7 whereas the higher temperatures are usually applied to effect the more sluggish reaction of Equation 8. As required, temperature control during the initial mixing of reactants is achieved in conventional manner such as by cooling or appropriate adjustment of the rate at which the reactants are fed to the reactor. The relative proportions of reactants are such to at least satisfy the indicated stoichiometric requirements of the addition, although either reactant may be employed in excess of stoichiometry to favor completion of the reactions. Usually, no more than a 10 percent molar excess of either reactant is employed. The reactions encompassed by Equations 3-8 proceeed at satisfactory rates at ambient or substantially atmospheric pressure, although they may be carried out at elevated pressures such as up to about 1000 pounds per square inch gauge (p.s.i.g.). When the reactions are effected under pressure, an excess of the amine reactant is employed in order to avoid polymerization of the unsaturated nitrile at elevated temperatures.

When the alpha,beta-unsaturated nitrile shown in Equations 3-8 is replaced with a beta-cyanohydrin or a beta-alkoxynitrile as Reactant B, the indicated beta-amino nitriles are formed together with water or an alcohol as the respective by-products. These additional methods for producing the catalysts employed as described herein are illustrated by the following Equations 9 and 10:

(9)

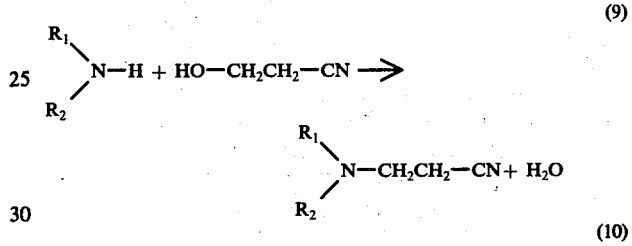

(10)

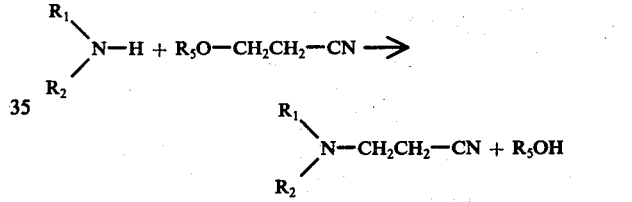

The condensation reactions illustrated by Equation 9 are effected at elevated temperatures such as from about 225° C. to about 450° C. in the presence of a dehydration catalyst such as alumina, zirconia and others as described, for example, in U.S. Pat. No. 2,439,359. The reactions illustrated by Equation 10 are effected at lower temperatures such as from about 150° C. to about 230° C. and are also known to the art; see, for example, U.S. Pat. No. 2,425,693.

When the alpha,beta-unsaturated nitrile shown in Equations 3-8 is replaced with a beta-halonitrile, the respective reactions also provide the beta-amino nitriles employed in the practice of this invention, as illustrated by Equation 11:

(11)

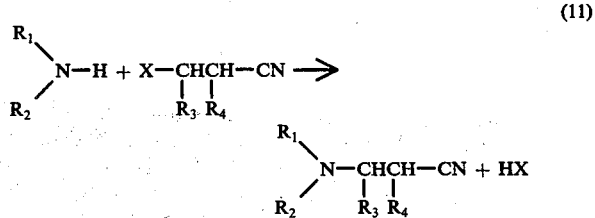

Such reactions are carried out at temperatures between about 50° C. and about 150° C. under ambient pressure conditions. The product is usually treated with a base such as alkali metal hydroxide in order to neutralize the hydrohalide salt and thereby maximize the yield of desired beta-amino nitrile.

In order to minimize formation of by-products by retro-addition reactions and hydrolysis of the cyano-bearing reactants as well as products, it is recommended practice to effect the above-described reactions under anhydrous or substantially anhydrous conditions. Thus, the reaction media should contain less than about 5 weight percent water, expressed on the basis of amine reactant. By-products such as alpha,beta-unsaturated nitriles may also be formed during the reactions. The polymerization of such by-products and unsaturated nitrile reactants, however, is at a minimum in view of the inhibiting effect of the amine reactants on such polymerization. The reactions may be effected in the presence of solvents or diluents such as, for example, ethanol, butanol, diisopropyl ether, dioxane and other such compounds which are inert under the reaction conditions.

The technique by which the beta-amino nitrile catalysts are recovered depends largely on their physical nature and properties. Thus, the normally liquid products such as those encompassed by Formulas II-A, II-B, III and IV (where R° is lower alkyl) are recovered by distillation or as residue products remaining after removal of more volatile components. The catalysts encompassed by Formula II-C and Formula IV (where R° is cyanoalkyl) are normally solid compounds and are recovered by conventional liquid-solid separation techniques.

The effectiveness of the beta-amino nitrile compounds as catalysts for cellular urethane manufacture as described herein does not depend on their use in a rigorously pure state. Included within the scope of the present invention, therefore, is the use of the catalysts as either substantially pure compounds, in combination with one another, or in association with impurities which may form during their manufacture.

B. THE FOAM FORMULATIONS

In producing cellular urethane polymers in accordance with the teachings of this invention, the reaction mixture or foam formulation contains, in addition to the beta-amino nitrile catalysts, an organic polyisocyanate cyanate and an active hydrogen-containing organic compound having an average of at least two and usually not more than eight active hydrogen atoms present as hydroxyl groups. Such organic polyol reactants include compounds consisting of carbon, hydrogen and oxygen as well as compounds which contain these elements in combination with phosphorus, halogen and/or nitrogen. Suitable classes of organic polyol reactants for use in the method of this invention are polyether polyols, polyester polyols, polylactone polyols, nitrogen-containing polyols, phosphorus-containing polyols, phenolic-based polyols, and polymer/polyols produced by polymerizing an ethylenically unsaturated monomer in one of the aforesaid polyols in the presence of a free radical initiator.

It is well known to the polyurethane art that the particular polyol reactant or combination of polyols employed depends upon the end-use of the polyurethane product which in turn determines whether the product is to be provided as a flexible, semi-flexible or rigid material. For this purpose, the polyol reactant is usually characterized by its hydroxyl number which is determined by and defined as the number of milligrams of potassium hydroxide required for the complete neutralization of the hydrolysis product of the fully acetylated derivative prepared from 1 gram of polyol or mixture of polyols. The hydroxyl number is also defined by the following equation which reflects its relationship with the functionality and molecular weight of the polyol reactant:

$$OH = \frac{56.1 \times 1000 \times f}{M.W.}$$

wherein
OH = hydroxyl number of the polyol;
$f$ = average functionality, that is, average number of hydroxyl groups per molecule of polyol; and
M.W. = average molecular weight of the polyol.

The beta-amino nitriles described herein are suitably employed as catalytic components of foam formulations containing polyols having hydroxyl numbers from about 20 to 1000. In producing flexible foams, polyols having relatively low hydroxyl numbers such as from about 20 to 100 are generally employed. In producing semi-flexible materials, the hydroxyl number is usually from about 100 to about 300. Polyols having relatively high hydroxyl numbers of from about 300 to about 1000 are used in rigid foam formulations.

Suitable polyethers that can be employed include linear and branched polyethers preferably having a plurality of ether linkages and containing at least two hydroxyl groups and being substantially free from functional groups other than hydroxyl. For convenience, this class of polyether polyols are referred to herein as Polyol I. These compounds include alkylene oxide adducts of water such as polyethylene glycols having average molecular weights from about 200 to about 600, polypropylene glycols having average molecular weights from about 400 to about 2000, and polyoxyalkylene polyols having a combination of different alkylene oxide units. Other suitable polyols encompassed within the definition of Polyol I are the alkylene oxide adducts of polyhydric organic initiators, the nature of which determines the average hydroxyl functionality of the polyoxyalkylated product. Illustrative of suitable polyhydric organic initiators are the following which can be employed individually or in combination with one another: (1) diols such as ethylene glycol, diethylene glycol, propylene glycol, 1,5-pentanediol, hexylene glycol, dipropylene glycol, trimethylene glycol, 1,2-cyclohexanediol, 3-cyclohexene-1,1-dimethanol and 3,4-dibromocyclohexane-1,1-dimethanol; (2) triols such as glycerol, 1,2,6-hexanetriol, 1,1,1-trimethylolethane, 1,1,1-trimethylolpropane, 3-(2-hydroxyethoxy)- and 3-(2-hydroxypropoxy)-1,2-propanediols, 2,4-dimethyl-2-(2-hydroxyethoxy)methyl-pentanediol-1,5, 1,1,1-tris[(2-hydroxyethoxy)methyl]ethane and 1,1,1-tris [(2-hydroxypropoxy)methyl]propane; (3) tetrols such as pentaerythritol; (4) pentols, hexols, heptanols and octanols such as glucose, sorbitol, bis(2,2,2-tri-methylol-)ethyl ether, alpha-methyl glucoside, sucrose, mannose and galactose; (5) compounds in which hydroxyl groups are bonded to an aromatic nucleus such as resorcinol, pyrogallol, phloroglucinol, di-, tri- and tetraphenylol compounds such as bis(p-hydroxyphenyl)methane and 2,2-bis(p-hydroxyphenyl)-propane; and (6) alkylene oxide adducts of the aforesaid initiators such as propylene or ethylene oxide adducts of glycerol having a relatively low average molecular weight up to about 650. Particularly useful in the preparation of flexible foams generally are polyether polyols having an average hydroxyl functionality of from about 2.1 to about 4.

Such polyols are provided by the employment of either trihydric or tetrahydric starters, mixtures thereof, or appropriate mixtures containing diol starters. The more highly functional polyether polyols are usually employed in providing the semi-flexible and rigid foams.

The above-described polyether polyols are normally liquid materials and, in general, are prepared in accordance with well known techniques comprising the reaction of the polyhydric starter and an alkylene oxide in the presence of an oxyalkylation catalyst. Usually, the catalyst is an alkali metal hydroxide such as, in particular, potassium hydroxide. The oxyalkylation of the polyhydric initiator is carried out at temperatures ranging from about 90° C. to about 150° C. and usually at an elevated pressure up to about 200 p.s.i.g., employing a sufficient amount of alkylene oxide and adequate reaction time to obtain a polyol of desired molecular weight which is conveniently followed during the course of the reaction by standard hydroxyl number determinations, as defined above. The alkylene oxides most commonly employed in providing the reactants encompassed by Polyol I, are the lower alkylene oxides, that is, compounds having from 2 to 4 carbon atoms including ethylene oxide, propylene oxide, butylene oxides (1,2- or 2,3-) and combinations thereof. When more than one type of oxyalkylene unit is desired in the polyol product, the alkylene oxide reactants may be fed to the reaction system sequentially to provide polyoxalkylene chains containing respective blocks of different oxyalkylene units or they may be fed simultaneously to provide substantially random distribution of units. Alternatively, the polyoxyalkylene chains may consist essentially of one type of oxyalkylene unit such as oxypropylene capped with oxyethylene units.

A second class of polyols that are suitable for use in preparing polyurethane foams in accordance with the present invention are polymer/polyols which, for convenience, are referred to herein as Polyol II. Such reactants are produced by polymerizing one or more ethylenically unsaturated monomers dissolved or dispersed in any of the other types of organic polyol reactants described herein, in the presence of a free radical catalyst. Especially suitable as the substrate polyols for producing such compositions are any of the above-described polyether polyols encompassed by the definition of Polyol I. Illustrative of suitable ethylenically unsaturated monomers are vinyl compounds having the general formula,

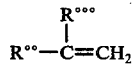

where: $R^{\circ\circ}$ is hydrogen, methyl or any of the halogens (i.e., fluorine, chlorine, bromine or iodine); and $R^{\circ\circ\circ}$ is $R^{\circ\circ}$, cyano, phenyl, methyl-substituted phenyl, carboalkoxy, or alkenyl radicals having from 2 to 6 carbon atoms such as vinyl, allyl and isopropenyl groups. Typical examples of such polymerizable monomers are the following which may be employed individually or in combination: ethylene, propylene, acrylonitrile, methacrylonitrile, vinyl chloride, vinylidene chloride, styrene, alpha-methylstyrene, methyl methacrylate, and butadiene. These and other polymer/polyol compositions which are suitably employed either individually or in combination with Polyol I are those described on British Pat. No. 1,063,222 and U.S. Pat. Nos. 3,304,273, 3,523,093 and 3,383,351, the disclosures of which are incorporated herein by reference. Such compositions are prepared by polymerizing the monomers in the polyol at a temperature between about 40° C. and about 150° C. employing any free radical-generating initiator including peroxides, persulfates, percarbonates, perborates and azo compounds. Illustrative of suitable initiators are: hydrogen peroxide, dibenzoyl peroxide, benzoyl hydroperoxide, lauroyl peroxide and azobis-(isobutyronitrile).

The polymer/polyol compositions usually contain from about 5 to about 50, and more usually from about 10 to about 40, weight percent of the vinyl monomer or monomers polymerized in the polyol. Especially effective polymer/polyols are those having the following composition:

A. from about 10 to about 30 weight percent of a copolymer of (1) acrylonitrile or methacrylonitrile, and (2) styrene or alpha-methylstyrene, the said copolymer containing from about 50 to 75 and from about 50 to 25 weight percent of monomeric units of (1) and (2), respectively; and B. from about 90 to about 70 weight per cent of one or more of the polyols encompassed by Polyol I as the medium in which said component (A) is polymerized, the trifunctional polyols such as alkylene oxide adducts of glycerol being especially suitable. These polymer/polyol compositions containing components (A) and (B) are the subject of copending U.S. application Ser. No. 176,317, filed Aug. 30, 1971, in the name of David C. Priest, and now abandoned.

Other types of suitable polyol reactants for use in producing cellular polyurethanes as described herein are polyester polyols containing an average of at least two hydroxyl groups per molecule (as alcoholic OH or as OH in —COOH groups). As is known to the art such polyester polyols are provided as the reaction products of: (1) a polyfunctional organic carboxylic acid, and (2) one or more of the aforesaid polyether polyols such as those encompassed by the definition of Polyol I, or one or more of the aforesaid polyhydric organic initiators which are reacted with alkylene oxide to produce such polyether polyols, such as, for example, diethylene glycol, glycerol and 1,1,1-trimethylolpropane. Among the suitable polycarboxylic acids that can be employed in producing such polyester polyols are: the aliphatic acids which are usually free of reactive unsaturation such as ethylenic and acetylenic groups, such as, for example, succinic, adipic, sebacic, azelaic, glutaric, pimelic, malonic and suberic acids; cycloaliphatic acids such as chlorendic acid; and aromatic polybasic acids such as phthalic, terephthalic, isophthalic acids and the like. Other polycarboxylic acids that can be employed are the "dimer acids" such as the dimer of linoleic acid. Hydroxyl-containing monocarboxylic acids (such as ricinoleic acid) can also be used. Alternatively, the anhydrides of any of these various acids can be employed in producing the polyester polyols.

Also contemplated for use as a polyol reactant of the foam formulations employed in the practice of this invention are nitrogen-containing polyols. Such polyols include lower alkylene oxide adducts of the following amines which may be employed individually or in combination: primary and secondary polyamines such as ethylenediamine, diethylenetriamine and toluenediamine; and aminoalkanols such as ethanolamine, diethanolamine, triethanolamine and triisopropanolamine. Also suitable are mixed starters containing one or more of the aforesaid polyfunctional amines, aniline, and/or one or more of the polyhydric initiators employed to produce Polyol I such as dipropylene glycol, glycerol and sucrose. Also illustrative of suitable nitrogen-containing polyols are aniline/formaldehyde and aniline/phenol/formaldehyde condensation products. Such amine-based polyols are usually employed in rigid foam formulations.

Other suitable polyols for use in producing polyurethane foams as described herein are: lactone-based polyols prepared by reacting a lactone such as a epsilon-caprolactone, or a mixture of epsilon-caprolactone and an alylene oxide, with a polyfunctional initiator such as a polyhydric alcohol, an amine, or an aminoalcohol; phosphorus-containing polyols such as the alkylene oxide adducts of phosphoric acid, polyphosphoric acids such as tri- and tetra-phosphoric acids, organo-substituted phosphoric acids such as benzenephosphoric acid; and other polyol reactants known to the polyurethane art.

The beta-amino nitriles described herein are used with particular advantage as catalysts in the manufacture of high-resilience flexible foam. Such foams usually have a resiliency of from about 55 to about 70 percent, as measured by standard test procedure ASTM D-1564-69. In accordance with a preferred embodiment of this aspect of the present invention, the beta-amino nitriles are employed as catalytic components of highresilience foam formulations wherein at least 40 weight percent of the total polyol content is constituted of a polyether triol having the following additional characteristics: (a) an average primary hydroxyl content of at least 40 mole percent (or no more than 60 mole percent of the less reactive secondary hydroxyl groups); and (b) an average molecular weight of from about 2000 to about 8000. For convenience, this particular class of polyols are referred to herein as Polyol I-A. Preferably, such polyether triols for use as components of highresilience formulations contain from about 60 to about 90 mole percent of primary hydroxyl groups and have an average molecular weight of from about 4000 to about 7000. Consistent with their trifunctionality and the aforesaid respective ranges of molecular weight, such polyether triols have hydroxyl nubmers from 84 to 21, preferably from 42 to 24. These highly reactive polyether triols are provided by oxyalkylation of one of the aforesaid trihydric starters such as glycerol, with propylene oxide and ethylene oxide. Usually, the total ethylene oxide content of the polyether triols encompassed by the definition of Polyol I-A is between about 7 and about 20 weight percent, expressed on the basis of total alkylene oxide fed during the oxyalkylation reaction. The high primary hydroxyl content is introduced by capping of the polyoxyalkylene chains with at least a portion of the total ethylene oxide feed.

In providing high-resilience foams, the polyether triols included within the definition of Polyol I-A may be used as essentially the sole type of polyol in the formulation or they may be employed in combination with other polyols to control the degree of softness or firmness of the foam and to vary the load-bearing properties. For example, when softer grade high-resilience foams are desired, Polyol I-A may be used in combination with polyether diols such as the above-described lower alkylene oxide adducts of a dihydric initiator such as dipropylene glycol. When firm grades of high-resilience foams having enhanced load-bearing properties are desired, Polyol I-A is used in combination with up to about 60 parts by weight per 100 parts by weight of total polyol reactant (p.p.h.p.) of a polymer/polyol encompassed within the definition of Polyol II. In this latter respect, particularly effective mixtures of polyols are those containing:

1. from about 40 to about 80 p.p.h.p. of the polyether triols, designated hereinabove as Polyol I-A; and
2. from about 60 to about 20 p.p.h.p. of polymer/polyols, designated herein as Polyol II-A, prepared by the in situ polymerization of a mononmer mixture containing from about 50 to about 75 weight percent of acrylonitrile and from about 50 to about 25 weight percent of styrene, in Polyol I-A, the said monomer mixture constituting from about 10 to about 30 weight percent of the combined weight of the monomers and Polyol I-A.

The polyisocyanates used in the manufacture of polyurethanes are known to the art and any such reactants are suitably employed in producing polyurethane foams in the presence of the beta-amino nitriles catalysts described herein. Among such suitable polyisocyanates are those represented by the general formula:

wherein: $i$ has an average value of at least two and is usually no more than six, and Q represents an aliphatic, cycloaliphatic or aromatic radical which can be an unsubstituted hydrocarbyl group or a hydrocarbyl group substituted, for example, with halogen or alkoxy. For example, Q can be an alkylene, cycloalkylene, arylene, alkyl-substituted cycloalkylene, alkarylene or aralkylene radical including corresponding halogen- and alkoxy-substituted radicals. Typical examples of polyisocyanates for use in preparing the polyurethanes of this invention are any of the following including mixtures thereof: 1,6-hexamethylene diisocyanate, 1,4-tetramethylene diisocyanate, bis(2-isocyanatoethyl)-fumarate, 1-methyl-2,4-diisocyanatocyclohexane, bis(4-isocyanatophenyl)methane, phenylene diisocyanates such as 4-methoxy-1,4-phenylenediisocyanate, 4-chloro-1,3- phenylenediisocyanate, 4-bromo-1,3-phenylenediisocyanate, 5,6-dimethyl-1,3-phenylenediisocyanate, 2,4-tolylene diisocyanate, 2,6-tolylene diisocyanate, crude tolylene diisocyanates, 6-isopropyl-1,3-phenylenediisocyanate, durylene diisocyanate, triphenylmethane-4,4′,4″-triisocyanate, and other organic polyisocyanates known to the polyurethane art. Other suitable polyisocyanate reactants are ethylphosphonic diisocyanate and phenylphosphonic diisocyanate. Of the aforesaid types of polyisocyanates, those containing aromatic nuclei are generally preferred.

Also useful as the polyisocyanate reactant are polymeric isocyanates having units of the formula:

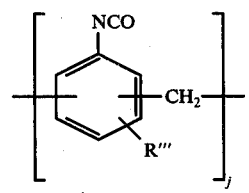

wherein R‴ is hydrogen and/or lower alkyl and $j$ has an average value of at least 2.1. Usually, the lower alkyl radical is methyl and $j$ has an average value no higher than about 4. Particularly useful polyisocyanates of this type are the polyphenylmethylene polyisocyanates produced by phosgenation of the polyamine obtained by acid-catalyzed condensation of aniline with formaldehyde. Polyphenylmethylene polyisocyanates of this type are available commercially under such trade names as PAPI, NIAX Isocyanate AFPI, Mondur MR, Isonate 390P, NCO-120, Thanate P-220, NCO-10 and NCO-20. These products are low viscosity (50–500 centipoises at 25° C.) liquids having average isocyanato functionalities in the range of about 2.25 to about 3.2 or higher, and free —NCO contents of from about 25 to about 35 weight percent, depending upon the specific aniline-to-formaldehyde molar ratio used in the polyamine preparation.

Also useful as polyisocyanate reactants are polymeric tolylene diisocyanates obtained as residues from the manufacture of the diisocyanates and having a free —NCO content of from about 30 to about 50 weight percent. Other useful polyisocyanate reactants are combinations of diisocyanates with polymeric isocyanates containing more than two isocyanate groups per molecule. Illustrative of such combinations are: a mixture of 2,4-tolylene diisocyanate, 2,6-tolylene diisocyanate and the aforesaid polyphenylmethylene polyisocyanates and/or the aforementioned residue products.

Of the aforesaid polyisocyanates, those employed with particular advantage in providing high-resilience foams are mixtures containing from about 60 to about 90 weight percent of the isomeric tolylene diisocyanates and from about 40 to about 10 weight percent of the polyphenylmethylene polyisocyanates, in order to enhance the average —NCO functionality and thus the reactivity of the reaction mixture. When the high-resilience formulations contain diisocyanates as essentially the sole source of reactive —NCO, it is often desirable to include minor amounts, such as up to about 1.5 p.p.h.p., of cross-linking agents. Suitable additives for this purpose are diethanolamine, methyldiethanolamine and triethanolamine.

On a combined basis, the polyol reactant and organic polyisocyanate usually constitute the major proportion by weight of the polyurethane-forming reaction mixture. In general, the polyisocyanate and polyol reactants are employed in relative amounts such that the ratio of total —NCO equivalents to total active hydrogen equivalent (of the polyol and any water, when used) is from 0.8 to 1.5, usually from 0.9 to 1.20, equivalents of —NCO per equivalent of active hydrogen. This ratio is known as the Isocyanate Index and is often also expressed as a percent of the stoichiometric amount of polyisocyanate required to react with total active hydrogen. When expressed as a percent, the Isocyanate Index may be from 80 to 150, and is usually within the range of from about 90 to about 120. More usually, the Isocyanate Index is no more than about 115.

The beta-amino nitrile catalysts may be employed individually or in combination with one another and are present in the foam formulation in catalytically effective amounts. Thus, the total concentration thereof may vary over a relatively wide range such as from about 0.01 to about 10 or more parts by weight (exclusive of any carrier solvents or other additives) per 100 parts by weight of total polyol reactant (p.p.h.p.) contained in the reaction mixture. Usually, this catalytic component is present in an amount from about 0.05, most preferably from about 0.1, to about 6 p.p.h.p. In flexible foam formulations, it is usually adequate to employ the beta-amino nitrile catalysts in an amount up to about three p.p.h.p., whereas in rigid formulations, higher concentrations are usually used.

The beta-amino nitrile catalysts may be employed as the sole type of principal amine catalyst of the foam formulations described herein or they may be employed in combinations with one or more other tertiary amines. The latter can contain up to 24 carbon atoms and usually have no more than 12 carbon atoms. Among the suitable classes of such additional catalysts are tertiary amines consisting of carbon, hydrogen and amino nitrogen, as well as amines consisting of these three elements and oxygen wherein oxygen is present solely as ether or hydroxyl groups. Illustrative of such tertiary amines for use in combination with the beta-amino nitriles are: trimethylamine; triethylamine; tributylamine; N,N,N',N'-tetramethylethylenediamine; N,N,N',N'-tetramethyl-1,3-butanediamine; N,N-dimethylcyclohexylamine; N,N-dimethylbenzylamine; bis[2-(N,N-dimethylamino)alkyl]ethers such as bis[2-(N,N-dimethylamino)ethyl]ether and bis[2-(N,N-dimethylamino)-1-methyl-ethyl]ether; triethylenediamine; N-methylmorpholine; N-ethylmorphine; N-)2-hydroxyethyl)piperazine; 1,4-dimethylpiperazine; N-methyldiethanolamine; N,N-dimethylethanolamine; and other such tertiary amine polyurethane catalysts known to the art. The beta-amino nitriles may also be used in combination with the beta-tert.-amino carbonyl compounds described and claimed for use as urethane catalysts in copending application Ser. No. 309,906, filed Nov. 27, 1972, in the names of David C. Priest, Michael R. Sandner and David J. Trecker, now U.S. Pat. No. 3,821,131. The said beta-amino carbonyl compounds include beta-tert-amino amides and beta-tert-amino carboxylic acid esters such as, in particular, 3-dimethylamino- N,N-dimethylpropionamide [(CH$_3$)$_2$N-CH$_2$CH$_2$-C(O)N(CH$_3$)$_2$] and ethyl 3-(N,N-dimethylamino)propionate, respectively.

When used, the aforementioned supplementary tertiary amine catalysts may be present in the foam formulation in an amount within the aforesaid ranges defined with respect to the beta-amino nitrile catalysts, although usually the total amount of supplementary amine is no more than about one p.p.h.p. It is to be understood that the beta-amino nitrile catalyst and the supplementary tertiary amine, when used, may be added to the formulation as separate streams or in preblended form.

Illustrative of suitable blended catalysts provided by the present invention and which are especially useful as components of water-blown, flexible foam formulations including high-resilience systems, are those containing from about 10 to about 99 weight percent of the beta-amino nitrile compounds and correspondingly from about 90 to about 1 weight percent of one or more of the following: bis[2-(N,N-dimethylamino)ethyl]ether, triethylenediamine, dimethylethanolamine, 1,4-dimethylpiperazine, and 3-dimethylamino-N,N-dimethylpropionamide. In general, such blended catalysts preferably contain at least about 40, most preferably at least about 60, weight percent of the beta-amino nitrile catalysts described herein. It is to be understood that the said weight percentages are based on the total weight of the blended catalysts, exlusive of carrier solvents or other additives. These blends are added to the foam formulations in an amount sufficient to provide the beta-amino nitrile catalyst and supplementary amine within the aforesaid respective ranges of concentration, that is, between about 0.01 and about 10 p.p.h.p.

From the standpoint of providing an effective catalyst system, the beta-amino nitrile catalyst may also be used, as included in the foregoing description, in combination with N-alkylmorpholines such as N-ethylmorpholine. The latter compound is presently used in commercial practice in relatively high concentrations (up to about 2.5 p.p.h.p.) as a catalytic component of molded high-resilience formulations in order to provide foams having good mold-release characteristics. In view of the present discovery that such foams can be produced by employing the beta-amino nitrile catalysts described herein without the necessity of using N-ethylmorpholine, the latter catalyst may be completely eliminated, thereby avoiding the obnoxious residual foam odor associated therewith. It is to be understood, however, that N-ethylmorpholine may be used as a component of the foam formulations described herein without departing from the scope of this invention. When used, the level of such N-alkylmorpholine catalysts is desirably kept to a minimum such as no more than about 0.30 p.p.h.p.

It is to be understood that the beta-amino nitrile catalysts employed in accordance with the present invention, as well as the supplementary amines and blends based thereon, may be introduced to the foam formulations in undiluted form or as solutions in suitable carrier solvents such as diethylene glycol, dipropylene glycol and hexylene glycol. Other useful carrier solvents are lower alkylene oxide adducts of monohydric or polyhydric starters such as butanol, dipropylene glycol and glycerol. Such solvents (or diluents) generally include adducts containing from about 3 to about 30 oxyethylene or oxypropylene units, mixtures of such adducts, as well as adducts provided by reaction of the starter with ethylene oxide and propylene oxide, fed either as a mixed feed or sequentially. Among the suitable organic carrier solvents of this type are the ethylene oxide-propylene oxide adducts of butanol having the average formula, $C_4H_9(OC_3H_6)_u(OC_2H_4)_sOH$, wherein $s$ and $u$ may each have an average value from about 3 to about 30. Preferably, the values of $s$ and $u$ are such that the average molecular weight of these fluids is not substantially greater than about 2000 and the oxyethylene content is from about 20 to about 80 weight percent, based on total polyoxyalkylene content. Usually, the weight percent of oxyethylene is about the same as the weight percent of oxypropylene.

Also included within the scope of the present invention is the use of the beta-amino nitrile catalysts in combination with water soluble, non ionic surfactants of the class consisting of: (1) polyoxyalkylene ethers of higher alcohols having from 10 to 18 carbon atoms including mixtures thereof; and (2) polyoxyalkylene ethers of alkyl-substituted phenols in which the alkyl group can have from 6 to 15 carbon atoms. The length of the ether chain is such that appropriate hydrophilic character is provided to balance the hydrophobic portion derived from the alcohol or phenol and render the compound miscible with water. The chain may contain oxyethylene units either as essentially the sole type of unit or oxyethylene in combination with a minor amount of oxypropylene. It is preferred that the hydrophilic portion of such non ionic organic surfactants be composed essentially of oxyethylene monomeric units. Usually the average number of such —$OC_2H_4$— units ranges from about 4 to about 20, although upward of 30 such units can also be present.

Typical examples of non ionic surfactants which can be used in combination with the beta-amino nitrile catalysts employed in the practice of this invention are the adducts produced by reaction of from about 4 to about 30 moles of ethylene oxide per mole of any of the following hydrophobes including mixtures thereof: n-undecyl alcohol, myristyl alcohol, lauryl alcohol, trimethyl nonanol, tridecyl alcohol, pentadecyl alcohol, cetyl alcohol, oleyl alcohol, stearyl alcohol, nonylphenol, dodecylphenol, tetradecylphenol, and the like. Especially suitable are the ethylene oxide adducts of nonylphenol having the average composition, $C_9H_{19}$—$C_6H_4$—$(OC_2H_4)_h$—$OH$, wherein $h$ has an average value from about 4 to about 20, inclusive of the whole and fractional numbers, such as 6, 9, 10.5 and 15.

The above-described solution compositions may contain from about 10 to about 90 weight percent of total beta-amino nitrile catalyst (inclusive of supplementary tertiary amine catalyst, when used), based on the combined weight of catalyst, solvent and/or non ionic surfactant, depending upon whether the catalyst is employed in combination with either one or both of the solvent and non ionic surfactant.

In producing polyether polyol-based polyurethanes including the above-described polymer polyols, it is often desirable to include as a further component of the foam formulation a minor amount of certain metal catalysts, particularly organic derivatives of tin including stannous and stannic compounds. Such metal co-catalysts are well known to the art. Illustrative of suitable organic tin compounds are the following which may be employed individually or in combination: stannous salts of carboxylic acids such as stannous octoate, stannous oleate, stannous acetate and stannous laurate; dialkyltin dicarboxylates such as dibutyltin dilaurate, dibutyltin diacetate, dilauryltin diacetate, dibutyltin di(2-ethylhexanoate) and other such tin salts as well as dialkyltin oxides, trialkyltin oxides, tin mercaptides such as, for example, di-n-octyl tin mercaptide, and the like. When used, the amount of such metal co-catalysts ranges from about 0.001 to about 2 parts by weight per 100 parts by weight of total polyol reactant. In flexible foam formulations, the metal co-catalyst is preferably used in an amount from about 0.01 to about 0.6 p.p.h.p., and most preferably in an amount no more than about 0.5 p.p.h.p.

Co-catalysts are also often employed as components of polyester polyol-containing formulations in order to avoid foam splitting by providing a tighter foam, highly porous foams having a greater tendency to develop splits. Suitable co-catalysts for this purpose are: hexadecyldimethylamine, dicyclohexylmethylamine, pentamethyldiethylenetriamine and N,N-dimethylbenzylamine. When used, such tertiary amine co-catalysts are present in the polyester polyol-containing formulations in an amount from about 0.1 up to about one p.p.h.p.; usually no more than about 0.6 p.p.h.p. is used.

Foaming is accomplished by the presence in the reaction mixture of varying amounts of a polyurethane blowing agent such as water which, upon reaction with isocyanate, generates carbon dioxide in situ, or through the use of blowing agents which are vaporized by the exotherm of the reaction, or by a combination of the two methods. These various methods are known in the art. Thus, in addition to or in place of water, other blowing agents which can be employed in the process of this invention include methylene chloride, liquefied gases which have boiling points below 80° F. and above −60° F., or other inert gases such as nitrogen, carbon dioxide added as such, methane, helium and argon. Suitable liquefied gases include aliphatic and cycloaliphatic fluorocarbons which vaporize at or below the temperature of the foaming mass. Such gases are at least partially fluorinated and may also be otherwise halogenated. Fluorocarbon agents suitable for use in foaming formulations of this invention include: trichloromonofluoromethane; dichlorodifluoromethane; 1,1-dichloro-1-fluoroethane; 1,2,2-trifluoro-1,1,2-trichloroethane; 1,1,1-trifluoro-2-fluoro-3,3-difluoro-4,4,4-trifluorobutane; hexafluorocyclobutene; and octafluorocyclobutane. Another useful class of blowing agents include thermally-unstable compounds which liberate gases upon heating, such as N,N'-dimethyl-N,N'-dinitrosoterephthalamide, and the like.

Generally, the blowing agent is employed in an amount from about 1 to about 45 parts by weight per 100 parts by weight of total polyol reactant, the particular blowing agent and amount thereof depending upon the type of foam product desired. Flexible foam formulations including those which favor formation of high-resilience foam, are most usually water blown, although a minor proportion such as up to about 10 weight percent of total blowing agent may be constituted of a fluorocarbon such as trichlorofluoromethane. Flexible foam formulations usually contain no more than about 10 p.p.h.p. of water. For rigid formulations, blowing action is usually supplied employing a fluorocarbon in a relatively high proportion such as from about 10 to about 45 p.p.h.p., either as the sole type of agent or in combination with a minor amount of water such as up to about 10 weight percent of total blowing agent. The selection and amount of blowing agent in any particular foam formulation is well within the skill of the cellular polyurethane art. a fluorocarbon in a relatively high proportion such as from about 10 to about 45 p.p.h.p., either as the sole type of agent or in combination with a minor amount of water such as up to about 10 weight percent of total blowing agent. The selection and amount of blowing agent in any particular foam formulation is well within the skill of the cellular polyurethane art.

In producing cellular polyurethanes in accordance with the method of this invention, a minor amount of an organosilicone surfactant may also be present as an additional component of the polyurethane-forming reaction mixture. When used, such surfactants are usually present in amounts up to about 5 parts by weight per 100 parts by weight of total polyol reactant.

Suitable classes of silicone surfactants are the polysiloxane-polyoxyalkylene block copolymers wherein the respective blocks are joined through silicon-to-carbon or silicon-to-oxygen-to-carbon bonds and the respective polyoxyalkylene blocks are bonded to different silicon atoms of the polysiloxane backbone to form a comb-like structure. Usually, the polysiloxane blocks are trialkysiloxy-endblocked. In addition to the siloxy units to which the pendant polyoxyalkylene chains are bonded, the polysiloxane backbone is formed of difunctional siloxy units wherein the respective two remaining valences of silicon are satisfied by bonds to organic radicals. Illustrative of such organic radicals are the hydrocarbyl groups having from 1 to 12 carbon atoms including alkyl, aryl, aralkyl, bicycloheptyl and halogen- substituted derivatives of such groups. The polyoxyalkylene blocks are usually constituted of oxyethylene units, oxypropylene units or a combination of such units, and the polyoxyalkylene chains are hydroxyl-terminated or capped with a monovalent organic group such as alkyl, aryl, aralkyl, acyl, carbamyl and the like. Especially useful as stabilizers of flexible polyether-based polyurethane foams are the block copolymers described in U.S. Pat. No. 3,505,377, an application for reissue of which was filed on Nov. 18, 1971 as Ser. No. 200,242 of Edward L. Morehouse, now U.S. Pat. No. Re. 27,541. The copolymers of the latter patent contain from 40 to 200 dimethylsiloxy units as essentially the sole type of difunctional unit, and from 15 to 60 weight per cent of the oxyalkylene content of the polyoxyalkylene blocks is constituted of oxyethylene. Also useful as stabilizers of flexible, polyether-based polyurethane foam including flame-retarded foam, are the block copolymers described in U.S. Pat. No. 3,657,305. The polysiloxane backbone of the organosilicones of the latter patent, contains an average of from 10 to 200 dimethylsiloxy units in combination with from 1 to 50 methyl-aralkylsiloxy units such as, in particular, methyl-phenylethylsiloxy units [(CH₃)(C₆H₅CH₂CH₂)SiO]. Other useful foam stabilizers for flexible polyether-based foam are the block copolymers described in U.S. Pat. No. 3,686,254.

A second type of foam-stabilizing component which can be present in the formulations described herein are the branched block copolymers described in U.S. Pat. No. 2,834,748. Organosilicone foam stabilizers described in the latter patent include those containing a trifunctional siloxy unit to which three polyoxyalkylene blocks are bonded through dialkyl-substituted siloxy units. A preferred group are those having the formula, MeSi[(OSiMe$_2$)$_d$OC$_a$H$_{2a}$)$_b$OR]$_3$, wherein Me is methyl, $d$ has a value of at least one, $a$ is from 2 to 3, $b$ has a value of at least 5, and R is hydrogen or a monovalent hydrocarbyl group such as lower alkyl, butyl being especially suitable.

Particularly useful as foam-stabilizing components of flame-retarded flexible polyurethane formulations in general are block copolymers wherein the polysiloxane blocks are trialkylsiloxy-endblocked and contain reoccurring difunctional dialkylsiloxy monomeric units in combination with reoccurring difunctional cyanoalkyl-alkylsiloxy or cyano- alkoxy-alkylsiloxy monomeric units, the mole ratio of the dialkylsiloxy units to the cyano-substituted siloxy units being about 10-200:3-100, and wherein the polysiloxane and polyoxyalkylene blocks are joined through an Si-C or an Si-O-C linkage, and from about 20 to about 65 weight percent of the oxyalkylene content of the polyoxyalkylene blocks is constituted of oxyethylene units. These block copolymers are described and claimed in copending application Ser. No. 279,883, filed Aug. 11, 1972, in the names of Bela Prokai and Bernard Kanner, now U.S. Patent No. 3,846,462. A preferred class of such surfactants are the cyanopropyl-substituted block copolymers having the average formula,

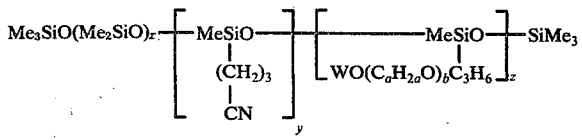

wherein: Me represents methyl; W represents a monovalent hydrocarbyl group (R'—), an acyl group [R'C(O)—] or a carbamyl group [R'NHC(O)—], the said R' group having from 1 to 12 carbon atoms; $x$ has an average value of from about 20 to about 100; $y$ has an average value of from about 4 to about 30; $z$ has an average value of from about 2 to about 10; $a$ has a value of from 2 to 4, provided from about 20 to about 65 weight percent of the oxyalkylene units of the polyoxylkylene chain, $-(C_aH_{2a}O)_b-$, are constituted of oxyethylene; and $b$ has an average value such that the average molecular weight of the polyoxyalkylene chain is from about 1000 to about 6000.

Because of the high reactivity of high-resilience foam formulations, the foams are generally self-stabilizing and can be obtained without the use of stabilizing agents. However, it is usually desirable to include a silicone surfactant as an additional component of such formulations in order to minimize the tendency of the foam to settle and to control cell uniformity. Particularly effective for this purpose are the relatively low molecular weight polyoxyalkylene-polysiloxane block copolymers described and claimed in copending application Ser. No. 84,181, filed Oct. 26, 1970, of Edward L. Morehouse, now U.S. Pat. No. 3,741,917. Especially suitable as components of high-resilience formulations are the block copolymers described therein having the formula,

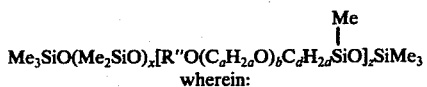

wherein:

$x$ has an average value of from 2 to 7; $b$ has a value from 3 to 10; $z$ has an average value from 2 to 6; $a$ and $d$ each has a value from 2 to 4; and R" is a monovalent hydrocarbon radical such as alkyl, aralkyl and aryl radicals, or an acyl group.

Also suitable as organosilicone components of high-resilience foam formulations are the relatively low molecular weight aralkyl-modified polymethylsiloxane oils described and claimed in copending application Ser. No. 305,713, filed Nov. 13, 1972, in the name of Edward L. Morehouse, and entitled, "Polyether Urethane Foam," now U.S. Pat. No. 3,839,384.

When used, the organosilicone component is usually present in high-resilience formulations in an amount between about 0.025 and about 2 parts by weight per 100 parts by weight of total polyol reactant.

Illustrative of suitable surfactant components of rigid foam formulations are copolymers wherein the polyoxyalkylene blocks are hydroxyl-terminated such as those described in U.S. Pat. No. 3,600,418.

With respect to formation of flexible polyester polyol based polyurethanes, suitable silicon-containing foam stabilizers include the polysiloxane-polyoxyalkylene block copolymers described, for example, in U.S. Pat. Nos. 3,563,924 and 3,594,334. Such copolymers include those characterized by a particular molecular weight (600–17000), siloxane content (14–40 weight percent based on the weight of the copolymer) and oxyethylene content (at least 75 weight percent based on the total amount of oxyalkylene groups in the copolymer). These organosilicones are usually employed in combination with an anionic, silicon-free organic emulsifier such as those descirbed in said U.S. Pat. No. 3,594,334 the teachings of which are incorporated herein by reference. Also effective as stabilizers of polyester-based foams are the organosilicones containing tetrafunctional $SiO_{4/2}$ units described an claimed in copending application Ser. No. 132,534, filed April 8, 1971, in the names of Bela Prokai and Bernard Kanner, now U.S. Pat. No. 3,793,360. Of This class of stabilizers, those having the following average formula are particularly preferred:

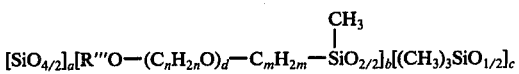

wherein $n$ has a value of 2 to 4 inclusive; $d$ has an average value of from about 5 to about 15; $m$ has a value of from 2 to 4; $a:b:c$ has an average value of 0.4–2:1:0.2–2, and R''' is phenyl, lower alkyl, lower alkaryl or aryl-substituted lower alkyl groups. Particularly effective are polymers in which at least a major proportion of the poly(oxyalkylene) chains are terminated by R°°° O— groups where the organic cap (R°°°) is methyl or benzyl.

Unlike flexible polyurethane foams derived from polyether polyols, stabilization of polyester foams may also be effected in the presence of silicon-free organic surfactants, also called emulsifiers. One significant property of the beta-amino nitrile catalysts described herein is that they allow for the formation of pumpable aqueous activator streams containing such emulsifiers. From the standpoint of enhanced activity for producing flexible polyester foams, it is especially desirable to employ the beta-amino nitrile in combination with one or more of the following additional amines: dimethylethanolamine, bis[2-(N,N-dimethylamino)ethyl]ether, triethylenediamine, 1,4-dimethylpiperazine and 3-dimethylamino-N,N-dimethylpropionamide. For this purpose, these amines as well as any amine co-catalyst, may be introduced to the foam formulation as individual streams, in preblended form, or in further combination with water and the organic emulsifier, that is, as components of the activator stream. However, from the standpoint of providing liquid (as opposed to gelled) activator streams containing organic stabilizers of polyester polyol-based urethane foam, the amount of the additional amine is usually no more than about 50 weight percent, based on the combined weight of the beta-amino nitrile and such additional amine contained in the blend thereof or present in the activator stream. For example, although the above-described blends containing up to about 90 weight percent of dimethylethanolamine are normally liquid and readily pumped, from the standpoint of providing liquid (as opposed to gelled) activator streams, the dimethylethanolamine is used in an amount no greater than about 50, and preferably no more than about 40, weight percent, based on the combined weight of the beta-amino nitrile and dimethylethanolamine contained in the blend thereof or present in the activator stream. On the other hand, in providing liquid (as opposed to gelled) activator streams containing the beta-amino nitrile in combination with bis[2-(N,N-dimethylamino)ethyl]ether, the latter compound is used in an amount no greater than 25, and preferably not substantially in excess of about 10, weight percent, based on the combined weight of the beta-amino nitrile and bis-ether contained in the blend thereof or present in the activator stream.

Silicon-free, organic surfactants or emulsifiers suitable as stabilizers of polyester polyolbased urethane foams as described herein are known to the art and are employed in amounts up to about 5 p.p.h.p. One class of organic emulsifiers suitable for this purpose are products obtained by the reaction of amines such as, in particular, diethylamine, with long chain fatty acids such as oleic acid or with sulfonated $C_{10}$-$C_{15}$ alkylated aromatic hydrocarbons. Another class are the liquid, anionic orgainc surfactants having at least one carbon-bonded sulfonic acid group, —$SO_3H$, or an ammonium, quaternary ammonium, alkali metal or alkaline earth metal derivative of said sulfonic acid group. The sulfonic acid groups or salt derivatives thereof can be substituents on a wide variety of "backbone" organic compounds which provide the hydrophobic portion of the emulsifier. The hydrophobic portion may consist of carbon and hydrogen as in sulfonated hydrocarbons (or salt derivatives thereof) having from 10 to 20 or more carbon atoms such as alkanes, high alkyl-substituted benzenes, and liquid petroleum fractions, as typically illustrated by sodium tetradecyl sulfonate, sodium dodecylbenzene sulfonate and sodium and potassium salts of sulfonated mineral oil. The —$SO_3H$ group or salt derivative thereof may also be a substituent on an organic backbone consisting of carbon, hydrogen an oxygen wherein oxygen is present in an ether linkage as in polyoxyalkylene groups or in a carboxylic acid ester group. Typical of such compounds are those obtained by sulfating or sulfonating oxyalkylated fatty acid esters wherein the oxyalkylation is usually effected with ethylene oxide, propylene oxide or a combination thereof. These and other organic stabilizers of polyester polyol-derived urethane foams are known to the art; see, for example, the description thereof in U.S. Pat. No. 3,594,334.

The beta-amino nitrile catalysts described herein are also effective catalytic components of flame-retarded foam formulations. The flame-retardants can be chemically combined in one or more of the other materials used (e.g., in the polyol or polyisocyanate), or they can be used as discrete chemical compounds added as such to the foam formulation. The organic flame-retardants preferably contain phosphorus or halogen, or both phosphorus and halogen. Usually, the halogen, when present, is chlorine and/or bromine. Flame-retardants of the discrete chemical variety include: 2,2-bis(bromomethyl)-1,3-propanediol; 2,3-dibromopropanol; tetrabromophthalic anhydride; brominated phthalate ester diols such as those produced from tetrabromophthalic anhydride, propylene oxide and propylene glycol; tetrabromobisphenol-A; 2,4,6-tribromophenol; pentabromophenol; brominated anilines and dianilines; bis(2,3-dibromopropyl)ether of sorbitol; tetrachlorophthalic anhydride, chlorendic acid; chlorendic anhydride; diallyl chlorendate; chlorinated maleic anhydride; tris(2-chloroethyl)phosphate [($ClCH_2CH_2O$)$_3P(O)$]; tris(2,3-dibromopropyl)phosphate; tris(1,3-dichloropropyl)phosphate; tris(1-bromo-3-chloroisopropyl)phosphate; tris(1,3-dichloroisopropyl)phosphate; bis(2,3-dibromopropyl) phosphoric acid or salts thereof; oxypropylated phosphoric and polyphosphoric acids; polyol phosphites such as tris(dipropylene glycol)-phosphite; polyol phosphonates such as bis(dipropylene glycol)hydroxymethyl phosphonate; di-poly(oxyethylene)-hydroxymethyl phosphonate; di-poly(oxypropylene)phenyl phosphonate; di-poly(oxypropylene)chloromethyl phosphonate; di-poly(oxypropylene)butyl phosphonate and O,O-diethyl-N,N-bis(2-hydroxyethyl)aminomethyl phosphonate. Also suitable are compounds having the formulas:

and

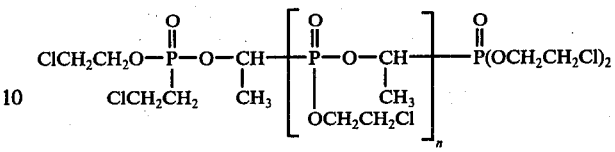

Other suitable flame-retardants comprise halogen-containing polymeric resins such as polyvinylchloride resins in combination with antimony trioxide and/or other inorganic metal oxides such as zinc oxide, as described in U.S. Pat. Nos. 3,075,927; 3,075,928; 3,222,305; and 3,574,149. It is to be understood that other flame-retardants known to the art may be used and that the aforesaid compounds may be employed individually or in combination with one another.

When used, the flame-retarding agent can be present in the foam formulations described herein in an amount from about 1 to about 30 parts by weight per 100 parts by weight of the polyol reactant, the particular amount employed depending largely on the efficiency of any given agent in reducing flammability.

If desired, other additional ingredients can be employed in minor amounts in producing the polyurethane foams in accordance with the process of this invention. Illustrative of such additives that can be employed are: cross-linking agents such as glycerol, diethanolamine, triethanolamine and their oxyalkylene adducts; additives to enhance load-bearing properties such as methylene-di-ortho-chloroaniline (MOCA); as well as fillers, dyes, pigments, anti-discoloration additives including anti-scorch and anti-oxidation agents, and the like.

With respect to the aforementioned anti-discoloration additives it is noted that, in the commercial manufacture of polyurethane slabstock, discoloration due to scorching may be observed in or toward the center sections of the bun where the heat due to the exotherm of the polyurethane-forming reaction is more intense and held longer. The discoloration becomes more evident as the size of the foam bun increases and is especially noticeable when the bun is cut into relatively thin sections as in the application of polyester polyol-dervied foam as a textile interliner. In general, such discoloration is inhibited by the addition to the foam formulation of minor amounts of various anti-scorch additives such as: phenols substituted with tertiary-butyl groups such as 2,6-di-tert-butyl-4-methylphenol ("Ionol"), and 2,4,6-tri-tert-butyl-phenol; tert-butylcatechol; p-methoxyphenol; phenothiazine; oxirane-containing compounds such as, in particular, propylene oxide; triorgano-substituted phosphites and phosphines such as, for example, triphenylphosphite and triphenylphosphine; and other known anti-scorch or antioxidizing agents including any combination of the aforesaid compounds. When used, such additives are present in the foam formulation in an amount between about 0.005 to about 1 part by weight, per 100 parts by weight of the beta-amino nitrile catalyst, and are usually added in combination with the beta-amino nitrile catalyst. It also is within the scope of the present teachings to incorporate the aforesaid discoloration preventatives in the beta-amino nitrile-containing blends provided by the present invention. For this purpose, the said additives may be present in the blend in a total amount from about 0.005 to about one weight percent, based on the combined weight of the beta-amino nitrile and additional amine contained in the blend, although usually no more than about 0.5 weight percent is used. It is found, however, that the specific problem of non uniform color of large polyester polyol-based foam buns is not always overcome by the presence of a particular known discoloration preventative. This was found to be the case of semi-commercial scale polyester foams buns produced employing the beta-amino nitrile catalyst in combination with dimethylethanolamine either in the absence of a scorch inhibitor or in the presence of various combinations of "Ionol," propylene oxide, triphenyl phosphite, p-methoxyphenol, and phenothiazine. Although such buns were scorched due to the presence of dimethylethanolamine, foam quality as reflected by physical properties, was good. Therefore, such foams are useful in applications where discoloration due to scorching can be tolerated such as when used as packaging material, in forming diecuttable foam a large proportion of which is pigmented with charcoal, or in other end-use applications where discoloration is not a significant factor. However, in the use of polyester foam for applications wherein essentially scorch-free foams of uniform color is desirable such as in the manufacture of aesthetically attractive textile laminates, scorching is usually undesirable and, from this standpoint, the beta-amino nitrile is employed essentially as the sole primary catalyst (as opposed to co-catalyst) or in combination with the other additional tertiary amines described herein such as, in particular, bis[2-(N,N-dimethylamino)ethyl]ether.

The cellular urethane polymers of the invention may be formed in accordance with any of the processing techniques known to the polyurethane art such as the "one-shot", quasi-prepolymer and prepolymer techniques. For example, in accordance with the one-shot process, foamed products are produced by carrying out the reaction of the polyisocyanate and the polyol reactants in the presence of the beta-amino nitrile-containing catalyst systems described herein, simultaneously with the foaming operations. This one-step process is usually employed in producing flexible foam including high-resilience foam, although it is also applicable to rigids. In preparing foamed products in accordance with the quasi-prepolymer technique, the polyisocyanate is first reacted with a portion of the polyol reactant to give a product having a high percentage of free —NCO groups (e.g., from 20 to 50 percent), and the product is subsequently foamed by reaction with additional polyol and foaming agent in the presence of the beta-amino nitrile catalysts. In the prepolymer technique, the polyisocyanate is reacted with a slightly less than stoichiometric quantity of the polyol reactant to form a prepolymer having a low percentage (e.g., from 1 to 10 percent) of free —NCO groups, followed by reaction of the prepolymer with a blowing agent such as water in the presence of the catalyst systems described herein to form the cellular material. These various multi-stage methods are more usually applied to rigid formulations.

In general, final or post-curing of the foam products is achieved by allowing the foam to stand at ambient temperatures until a tack-free product is obtained, or by subjecting the foam to elevated temperatures up to about 500° F. in order to achieve more rapid curing. In view of the higher reactivity of the combination of reactants employed in producing high-resilience foams, however, a sufficiently high degree of curing is achieved during foam formation without the necessity of subjecting the foam to conventional high temperature (e.g., 300°–500° F.) post-curing procedures which are otherwise applied in the commercial manufacture of flexible foams from less highly reactive flexible foam formulations.

In the specific application of the beta-amino nitriles described herein as catalytic components of molded, high-resilience foam formulations, the mold is charged with the foamable reaction mixture either at ambient temperature or pre-heated to a temperature of from about 70° F. to about 200° F., in an amount sufficient to at least completely fill the mold. The mold is then closed and the reaction mixture is allowed to foam and cure itself. In view of the good mold-release characteristics of the high-resilience foams produced in accordance with the present invention, the foamed product is readily removed from the mold without substantial damage to the foam surface. The demolded foam is suitable for end-use application without further curing. It is to be understood, however, that such foam may be subjected to further curing, as desired.

The end-use applications of cellular polyurethanes are well known. Thus, the polyurethane foams produced in accordance with the present invention are useful as textile interliners, cushioning material, mattresses, paddings, carpet underlay, packaging, gaskets, sealers, thermal insulators and the like.

The following examples are offered as further illustrative of the present invention and are not to be construed as unduly limiting. The particular beta-amino nitrile catalysts employed in the examples are designated Amine Catalysts I-IV and are identified below:

Amine Catalyst I is the know compound, 3-(N,N—dimethylamino)propionitrile, $(CH_3)_2N$—$CH_2CH_2$—$CN$, and is a normally liquid distillable material. It is readily prepared by the reaction of acrylonitrile and dimethylamine employing an excess of either reactant. For example, in one preparation, anhydrous dimethylamine (100 grams; 2.22 moles) was maintained below minus 10° C. by cooling with a Dry Ice/acetone bath, and a stoichiometric excess of acrylonitrile (132 grams; 2.5 moles) was fed thereto at a rate so as to maintain the temperature below 0° C. After the addition was complete, the reaction mixture was allowed to warm to room temperature and stand overnight. In another preparation, acrylonitrile (500 grams; 9.45 moles) was charged to a 3-liter rocker-bomb, and a stoichiometric excess of dimethylamine (450 grams; 10.0 moles) was added thereto under pressure. When addition was complete, the bomb and contents were heated to 80° –100° C. at a pressure of about 20–30 p.s.i.g. for about 2-3 hours. In both preparations the reaction mixtures were distilled to remove excess reactant, recovering product at 78° C. and 30 mm. Hg pressure (reported b.p. = 81° C./29 mm. Hg) in about 98 percent purity, as determined by gas-liquid chromatographic (glc) analysis, and about 95 percent yield, based on the reactant present in the limiting amount.

Amine Catalyst II is the known compound, 3-(N,N—diethylamino)propionitrile, $(C_2H_5)_2N$—$CH_2CH_2$—$CN$, and is also normally liquid and distillable. It was readily prepared as follows: Anhydrous diethylamine (216 grams; 3.0 moles) was added dropwise with stirring to a reaction flask containing acrylonitrile (186 grams; 3.5 moles) while maintaining the temperature below 50° C. After addition, the solution was heated at reflux (about 55°–60° C.) for about three hours. The mixture was distilled under reduced pressure and product 3-(N,N-diethylamino)propionitrile was recovered at 90° C./20 mm. Hg (literature b.p. = 93° –93.5° C./21 mm. Hg) in a purity of about 98 percent(glc) and a yield of 79.4 weight percent, based on diethylamine charged.

Amine Catalyst III is the known compound, 3-(4morpholino)propionitrile and has the formula,

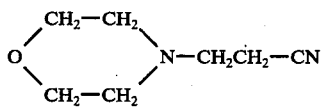

It was prepared as follows: Morpholine (216 grams; 3.0 moles) was added dropwise to a stirred solution of acrylonitrile (186 grams; 3.5 moles). During addition, the temperature was maintained below 50° C. and, after addition, the reaction mixture was allowed to stir overnight. The mixture was then distilled and product 3-(4-morpholine)propionitrile was collected at 112° C./10 mm. Hg (literature b.p. = 130° C./20 mm. Hg). Product purity (glc) was about 98 percent and recovery (269 grams) corresponded to a yield of 71.1 weight percent, based on morpholine charged.

Amine Catalyst IV is the known compound, 1,4-piperazinedipropionitrile, and has the formula,

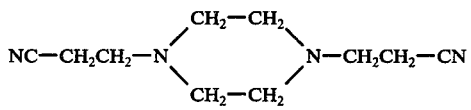

This beta-amino nitrile was prepared as follows: Acrylonitrile (58grams; 1.1 mole) was added dropwise to a stirred solution of 1,4-piperazine (43 grams; 0.5 mole) in 100 ml. of ethanol. After addition, the solution was allowed to stir overnight at room temperature. The reaction mixture was charged to a still and heated to 50°–100° C. under a reduced pressure of 300–100 mm. Hg until solvent no longer distilled. Product 1,4-piperazinedipropionitrile, which was taken as the residue product, solidified on standing and had a melting point of 63°–64° C. (literature m.p. = 62° –63° C.).

Various terms, foam procedures, foam properties and abbreviations used in the following examples are explained below:

Cream Time denotes the interval of time in seconds from the formation of the complete foam formulation to the appearance of a creamy color in the formulation.

Rise Time denotes the interval of time in seconds from the formation of the complete formulation to the attainment of the maximum height of a free-rise foam.

Gel Time denotes the interval of time in seconds for a free-rise foam to acquire sufficient strength to be handled.

Exit Time is observed in the preparation of molded foams and is the interval of time in seconds between formation of the complete formulation and the time when all four top holes of the mold are full, that is, when the foam begins to exude from all four holes of the mold.

FOAM PROCEDURE I. The polyol and polyisocyanate reactants and surfactant are weighed into a one-half gallon, five-inch diameter, cylindrical cardboard carton. The water and catalytic amine components are measured and blended together in a small beaker. The tin cocatalyst is measured into a hypodermic syringe. Eleven stainless-steel baffles are inserted into the carton and centered on a drill press equipped with a 1.65-inch, four-blade turbine. A timer is pre-set for a total of 90 seconds. The mixer is started at 2400 revolutions per minute and continued for 60 seconds. The mixer is stopped manually for 15-second de-gassing period. At 75 seconds on the timer, mixing is continued for five seconds before adding the aqueous amine premix. Mixing is continued five seconds and the tin cocatalyst is added after an additional five seconds of mixing. The blended contents are poured into a 14 × 14 × 6 cardboard box. Both the cream time and rise time are recorded. The foam is allowed to stand at room temperature for at least one day before being submitted for physical property measurements.

FOAM PROCEDURE II. An aluminum mold (4 or 2.5 × 15 × 15 ) is prepared by first waxing lightly with Brulin Permamold Release Agent and then pre-heating in a 140° C. oven for about 10 minutes to raise the temperature of the mold to 175° –200° F. Excess mold-release agent is wiped off and the mold is allowed to cool to 120° F. before foaming. The initial mixing of the components of the foam formulation is started when the mold is cooled to about 130° F. The purpose of pre-heating the mold to the initial high temperature is to remove solvent from the mold-release agent. All components of the reaction mixture, except the polyisocyanate reactant, are measured or weighed into a one-half gallon, five-inch diameter, cylindrical, cardboard carton and mixed 60 seconds with a two and one-half inch, six-blade turbine at 4000 revolutions per minute. The polyisocyanate reactant is then weighed into the mixture of the other components, stainless-steel baffles designed for the one-half gallon carton are inserted, and mixing is continued for 5 seconds. The carton is then lowered to allow the mixer to drain while observing the cream time, and the contents are quickly poured into the mold. The mold lid is closed, clamps are placed around the mold to prevent flashout, and the exit time is observed. The four-inch mold is demolded after standing at room temperature for ten minutes whereas the two and one-half inch mold is demolded after eight minutes. After trimming around the edges with scissors, the foam sample is weighed before running through rollers four times to crush cells open, and is then allowed to cure for three days at room temperature before being submitted for physical property measurements.

FOAM PROCEDURE III. The surfactants (that is, the foam stabilizers), amine catalyst or catalysts and water are premixed in a beaker. The polyester polyol is weighed into a container followed by the addition thereto of the polyisocyanate and mixing of these two reactants with a spatula until homogeneous. Further mixing is done on a drill press equipped with a double three-bladed marine-type propellor about three inches in diameter. The mixing in the drill press is accomplished at 1000 revolutions per minute for about eight seconds. Then the aforesaid premixture of surfactants, amine catalyst(s) and water is added and mixing is continued for about seven additional seconds. The reaction mixture is poured into a 12 × 12 × 12 cardboard box and is allowed to cure and rise to its maximum height. The foam is then post-cured for about 30 minutes at 120° C. The foam is removed from the oven and aged for 24 hours at ambient temperature before being cut open and observed for properties.

FOAM PROCEDURE IV. To a hennecke UBT-63 high pressure continuous polyurethane foam machine, there are fed: (1) a polyester polyol stream; (2) an activator stream containing water, amine catalysts and foam stabilizing surfactant; and (3) a polyisocyanate stream. The mixer speed is about 5000 revolutions per minute and the head pressure is 12–17 pounds per square inch. At ambient temperature the emerging foam mixture is poured onto paper on a continuously moving conveyor belt. The foams are allowed to set and cure in the form of large slabs (12 feet in length, 22 inches wide and 18 inches high). After 24 hours of aging at ambient temperature the foams are cut and submitted for physical property measurement.

Porosity (Air), which is a comparative measurement of the degree of openness of the cells of flexible foams, was determined in accordance with the following test procedure: The test specimen of foam ($4 \times 4 \times \frac{1}{2}$) is compressed between two pieces of flanged plastic tubing ($2\text{-}\frac{1}{2}$I.D.) of an air porosity assembly maintained under an air pressure of 14.7 pounds. Air is drawn through the thickness ($\frac{1}{2}$) of the foam specimen at a velocity controlled to maintain a differential pressure of 0.1 inch of water across the thickness dimension. The air flow necessary to develop the requisite pressure differential is recorded and the porosity of the foam is reported in units of air flow per unit area of the foam specimen (cubic feet per minute per square foot).

Breathability also denotes the porosity of a foam, being roughly proportional to the number of open cells in a foam, and was measured in accordance with the NOPCO breathability test procedure described by R. E. Jones and G. Fesman, "Journal of Cellular Plastics" (January 1965). It is a measure of air flow through a $2 \times 2 \times 1$ foam sample and is expressed as standard cubic feet per minute (SCFM).

Resiliency of both free-rise and molded foams was determined in accordance with ASTM D-1564-69.

Density, Tensile Strength, Elongation, Tear Resistance and Compression Set were measured as described under (1) ASTM D-1564-69 for the free-rise foams produced in accordance with Foam Procedures I and IV, and (2) ASTM D-2406-68 for the molded foams produced in accordance with Foam Procedure II.

Indentation Load Deflection (ILD Values) to 25% and 65% deflections were measured in accordance with (1) ASTM D-1564-69 for free-rise foams, the test sample being cut to a 4 inches thickness, and (2) ASTM D-2406-68 for molded foam samples, the thickness of the sample being 2-½inches or 4 inches depending upon whether the 2-½inches or 4 inches mold was used. Return Value is the percentage ratio of the load required to support the return 25% indentation after one minute as compared to the load required to support the initial 25% indentation after one minute. Load Ratio is the ratio of the 65% and 25% ILD values, respectively.

Humid Aging indicates that the foam sample was heated at 120° C. for five hours in 100 percent relative humidity.

The abbreviation "p.p.h.p." means parts by weight of a given component per 100 parts by weight of total polyol reactant contained in the foam formulation.

The abbreviation "p.b.w." means parts by weight.

EXAMPLES 1–7

In accordance with these examples, a series of flexible polyether polyol-based polyurethane foams were prepared following free-rise Foam Procedure I and employing reaction mixture containing Amine Catalysts I-IV as the respective sole tertiary amine catalytic component. The other components of the reaction mixture, designated Foam Formulation A, were as indicated in Table I which follows.

TABLE I
FOAM FORMULATION A

| Component | Parts By Weight |
|---|---|
| Polyol A: A glycerol-started poly(oxypropylene) triol having a Hydroxyl No. of about 56. | 100 |
| Polyisocyanate A: A mixture of the 2,4- and 2,6-isomers of tolylene diisocyanate present in a weight ratio of 80:20, respectively (Index = 105). | 49.7 |
| Water | 4.0 |
| Stannous octoate | 0.3 |
| Surfactant A /1/ | 1.0 |
| Amine Catalyst | Varied |

/1/ A polyoxyalkylene-polysiloxane block copolymer having the average composition:
$MeSi[(OSiMe_2)_{6.4}(OC_2H_4)_{19}(OC_3H_6)_{14}OC_4H_9]_3$ wherein Me is methyl.

The particular Amine Catalyst employed in each example and the relative proportion thereof, as well as the results and foam physical property data are given in Table II. For the purpose of comparison, Table II also includes data based on N-ethylmorpholine as the sole amine catalyst of Foam Formulation A. This comparative foam (C-1) was also prepared in accordance with Foam Procedure I.

TABLE II

| | FLEXIBLE FOAMS (Free-Rise) | | | | | | | |
|---|---|---|---|---|---|---|---|---|
| Example and Foam No. | — | 1 | 2 | 3 | 4 | 5 | 6 | 7 |
| Run and Foam No. | C-1 | — | — | — | — | — | — | — |
| Foam Formulation A | | | | | | | | |
| Amine Catalyst, p.p.h.p. | | | | | | | | |
| N-Ethylmorpholine | 0.80 | None | None | None | None | None | None | None |
| Amine Catalyst I /1/ | None | 0.2 | 0.4 | 0.8 | — | — | — | — |
| Amine Catalyst II /2/ | None | — | — | — | 0.2 | 0.8 | — | — |
| Amine Catalyst III /3/ | None | — | — | — | — | — | 0.4 | — |
| Amine Catalyst IV /4/ | None | — | — | — | — | — | — | 0.4 |
| Cream Time, seconds | 11 | 12 | 11 | 9 | 12 | 12 | 12 | 12 |
| Rise Time, seconds | 85 | 97 | 94 | 89 | 97 | 93 | 103 | 98 |
| Foam Properties | | | | | | | | |
| Resilience, % ball rebound | 49 | 45 | — | 46 | 44 | 45 | 43 | 42 |
| Porosity, ft.3/min./ft.$^2$ | 100 | 80 | — | 107 | 54.5 | 90.5 | 50 | 75.8 |
| Density, lbs./ft.$^3$ | 1.64 | 1.61 | — | 1.67 | 1.61 | 1.64 | 1.60 | 1.53 |
| ILD (4"), lbs./50 in.$^2$ | | | | | | | | |
| 25% deflection | 37.9 | 42.8 | — | 43.0 | 46.6 | 40.8 | 47.5 | 41.5 |
| 65% deflection | 69.5 | 77.2 | — | 80.0 | 83.1 | 74.0 | 83.2 | 73.8 |
| 25% return | 27.0 | 27.6 | /5/ | 28.1 | 28.5 | 26.0 | 29.7 | 26.5 |
| Return value, % | 71.2 | 64.4 | — | 65.0 | 61.2 | 63.7 | 62.6 | 63.8 |
| Load Ratio | 1.83 | 1.80 | — | 1.86 | 1.78 | 1.81 | 1.75 | 1.78 |
| Compression Sets, % | | | | | | | | |
| 90% | — | 4.8 | — | 4.72 | 6.12 | 5.65 | 5.48 | — |

TABLE II-continued

| | FLEXIBLE FOAMS (Free-Rise) | | | | | | | |
|---|---|---|---|---|---|---|---|---|
| Example and Foam No. | — | 1 | 2 | 3 | 4 | 5 | 6 | 7 |
| Run and Foam No. | C-1 | — | — | — | — | — | — | — |
| 50% After Humid Aging | — | 7.17 | — | 7.44 | 7.66 | 7.68 | 7.03 | 6.15 |
| Tensile Strength, p.s.i. | 16.3 | 17.2 | — | 15.8 | 18.0 | 17.6 | 18.2 | 17.4 |
| Elongation, % | 180 | 200 | — | 176 | 190 | 218 | 198 | 213 |
| Tear Resistance, lbs./in. | — | 2.46 | 2.20 | 2.32 | 2.67 | 2.31 | 2.64 | |
| Humid Age Load Loss, % | — | 13.0 | — | 14.8 | 14.2 | 11.4 | 15.6 | — |

/1/ d-Dimethylaminopropionitrile.
/2/ 3-Diethylaminopropionitrile.
/3/ 3-(4-morpholino)propionitrile.
/4/ 1,4-Piperazinedipropionitrile.
/5/ Foam quality satisfactory; physical properties not determined.

The data of Table II demonstrate that the beta-amino nitrile catalysts are catalytically active in promoting the isocyanate-water reaction and allow for the formation of flexible foams having an overall good combination of properties. It was also observed that freshly prepared Foams 1-7 were nearly odorless and were free of amine odor. Inasmuch as comparative Foam C-1 has a strong amine odor, it is evident that the beta-amino nitrile catalysts are advantageously used as direct replacements for N-ethylmorpholine.

EXAMPLES 8-10

Following free-rise Foam Procedure I, another series of foams, including control Foam K-l, were prepared employing Foam Formulation A. The respective Amine Catalyst components were 3-dimethylaminopropionitrile alone as in Examples 8 and 9, 3-dimethylaminopropionitrile in combination with dimethylethanolamine as in Example 10, and N-ethylmorpholine alone as in control Run K-1. The relative proportion of these amines and the results are given in Table III. Also included in Table III as Run C-2 are foam data based on the use of dimethylethanolamine as the sole amine catalyst component of Foam Formulation A; this foam was also prepared following Foam procedure I.

TABLE III

| | FLEXIBLE FOAMS (Free-Rise) | | | | |
|---|---|---|---|---|---|
| Example and Foam No. | — | — | 8 | 9 | 10 |
| Run and Foam No. | K-1 | C-2 | — | — | — |
| Foam Formulation A | | | | | |
| Almine Catalyst, p.p.h.p. | | | | | |
| N-Ethylmorpholine | 0.80 | None | None | None | None |
| Dimethylethanolamine | None | 0.2 | — | — | 0.13) /2/ |
| Amine Catalyst I /1/ | None | — | 1.0 | 0.8 | 0.47) |
| Cream Time, seconds | 11 | 8 | 11 | 11 | 10 |
| Rise Time, seconds | 92 | 94 | 101 | 103 | 97 |
| Foam Properties | | | | | |
| Resilience, % ball rebound | 47 | 40 | 44 | 46 | 45 |
| Porosity, ft.³/min./ft.² | 99 | 87 | 101 | 96.8 | 96.8 |
| Density, lbs./ft.³ | 1.56 | 1.57 | 1.5 | 1.51 | 1.46 |
| ILD (4"), lbs./50 in.² | | | | | |
| 25% deflection | 38.9 | 40 | 37.8 | 38.0 | 38.4 |
| 65% deflection | 71.0 | 71.6 | 64.9 | 68.0 | 66.1 |
| 25% return | 26.1 | 25.2 | 24.1 | 24.3 | 24.1 |
| Return value, % | 67.1 | 63.0 | 63.8 | 64.0 | 62.8 |
| Load Ratio | 1.82 | 1.79 | 1.72 | 1.79 | 1.72 |
| Compression Sets, % | | | | | |
| 90% | 3.92 | 4.69 | 4.45 | 4.42 | 3.80 |
| 50% After Humid Aging | 6.07 | 6.18 | 5.9 | 5.5 | 6.1 |
| Tensile Strength, p.s.i. | 14.6 | 15.3 | 10.4 | 15.6 | 15.0 |
| Elongation, % | 194 | 192 | 193 | 195 | 189 |
| Tear Resistance, lbs./in. | 1.98 | 2.0 | 2.16 | 1.96 | 1.95 |
| Humid Age Load Loss, % | 16.8 | 15.45 | 14.1 | 15.2 | 17.0 |

/1/ 3-Dimethylaminopropionitrile.
/2/ Added as blend (0.6 p.p.h.p.) of dimethylethanolamine (0.4 p.b.w.) and Amine Catalyst I (1.5 p.b.w.).

The data of Table III demonstrate that Foams 8-10 produced with 3-dimethylaminopropionitrile alone or in combination with dimethylethanolamine were of as good overall quality and porosity as control Foam K-1. However, in contrast to the control foam, Foams 8-10 did not suffer the disadvantage of having a strong residual amine odor.

EXAMPLES 11 and 12

In accordance with these examples, flexible polyether polyol-based polyurethane foams were prepared employing 3-dimethylaminopropionitrile and a blend thereof with dimethylethanolamine as the respective amine catalyst components of a reaction mixture, designated Foam Formulation B. A control foam (K-2) was also prepared from the same formulation except that N-ethylmorpholine was present as the sole catalytic amine component. The other components of Foam Formulation B are given in the following Table IV.

TABLE IV

| FOAM FORMULATION B | |
|---|---|
| Component | Parts By Weight |
| Polyol B: A polyether triol having a Hydroxyl No. of about 46 and containing less than 5 mole per cent of primary hydroxyl groups, derived from glycerol, propylene oxide and ethylene oxide, about 14 weight per cent of total oxide being ethylene oxide. | 100 |
| Polyisocyanate A /1/ (Index = 105) | 48.0 |
| Water | 4.0 |
| Stannous octoate | 0.275 |
| Surfactant B /2/ | 1.0 |
| Amine Catalyst | Varied |

/1/ As defined in Table I.
/2/ A polysiloxane-polyoxyalkylene block copolymer having the average composition:
Me₃SiO(Me₂SiO)₇₂[MeO(C₃H₆O)₂₉(C₂H₄O)₂₀C₃H₆SiMeO]₅.₁SiMe₃ where Me is methyl, employed as a 55 weight percent active solution.

The foams of Examples 11 and 12 and control Run K-2 were prepared following Foam Procedure I. The relative proportion of the amine component and the results are given in the following Table V.

The following Examples 13-19 demonstrate the efficacy and advantages of catalysts described herein as direct replacements for N-ethylmorpholine in high-resilience foam formulation. The particular reaction mixture employed are designated herein as Foam Formulations C and D. These formulations had the respective compositions given in Table VI which follows.

TABLE V
FLEXIBLE FOAMS (Free-Rise)

TABLE VI
FOAM FORMULATONS C and D

| Component | Parts By Weight C | Parts By Weight D |
|---|---|---|
| Polyol C: An ethylene oxide-capped, glycerol-started poly(oxypropylene) triol having a Hydroxyl No. of about 34, a molecular weight of about 5000, and a primary hydroxyl content of 70-75 mole per cent. | 60 | 80 |
| Polyol D: A polymer/polyether polyol having a Hydroxyl No. of about 28 and based on (parts by weight): styrene (10), acrylonitrile (10) and Polyol C (80), produced by polymerizing said monomers in Polyol C. | 40 | 20 |
| Polyisocyanate B: A mixture of: (1) 80 weight per cent of the 2,4- and 2,6- isomers of tolylene diisocyanate, the weight ratio of said isomers being 80:20, respectively; and (2) 20 weight per cent of a polyphenylmethylene polyisocyanate having an average —NCO functionality of 2.7 and a free —NCO content of 30.5-32.3 weight per cent. | 34.4 (Index = 107) | 40.0 (Index = 109) |
| Water | 2.6 | 3.0 |
| Amine Catalysts | | |
| Amine Catalyst A: A 70 weight per cent solution of bis[2-(N,N-dimethylamino)ethyl]ether in dipropylene glycol. | 0.10 | 0.10 |
| Amine Catalyst B: Triethylenediamine | 0.12 | 0.08 /3/ |
| N-Ethylmorpholine, Amine Catalyst I or Amine Catalyst I blended with dimethylethanolamine | Varied | |
| Dibutyltin dilaurate | 0.016 | 0.03 |
| Surfactant C /1/ | 0.75 | — |
| Surfactant D /2/ | — | 1.5 |

/1/ An organosilicone having the average composition, $Me_3SiO(Me_2SiO)_4[MeO(C_2H_4O)_3C_2H_4SiMeO]_{2.8}SiMe_3$, where Me represents methyl, employed as a 22 weight percent solution in a solvent mixture containing an ethylene oxide (about 9 moles average) adduct of nonylphenol and a polyether triol having a Hydroxyl No. of about 650.
/2/ Same as Surfactant C except the said organosilicone was employed as a 10 weight percent solution in Polyol C.
/3/ Added as 0.25 p.p.h.p. of a 33 weight per cent solution of triethylenediamine in dipropylene glycol.

| Run and Foam No. | K-2 | — | — |
|---|---|---|---|
| Foam formulation B | | | |
| Amine Catalyst, p.p.h.p. | | | |
| N-Ethylmorpholine | 0.80 | None | None |
| Amine Catalyst I /1/ | None | 0.80 | — |
| Blend of Amine Catalyst I and Dimethylethanolamine /2/ | None | — | 0.80 |
| Cream Time, seconds | 8 | 10 | 8 |
| Rise Time, seconds | 88 | 96 | 85 |
| Foam Properties | | | |
| Resilience, % ball rebound | 46 | 47 | 44 |
| Porosity, ft.³/min./ft.² | 81.2 | 75.4 | 72.6 |
| Density, lbs./ft.³ | 1.53 | 1.46 | 1.55 |
| ILD (4"), lbs./50 in.² | | | |
| 25% deflection | 39.6 | 36.3 | 41.7 |
| 65% deflection | 66.0 | 64.8 | 70.0 |
| 25% return | 25.0 | 22.2 | 25.7 |
| Return value, % | 63.1 | 61.1 | 61.6 |
| Load Ratio | 1.67 | 1.78 | 1.68 |
| Compression Sets, % | | | |
| 90% | 4.3 | 5.13 | 4.28 |
| 50% After Humid Aging | 5.92 | 6.2 | 6.1 |
| Tensile strength, p.s.i. | 16.9 | 17.3 | 15.3 |
| Elongation, % | 250 | 255 | 208 |
| Tear Resistance, lbs./in. | 2.86 | 2.61 | 2.45 |
| Humid Age Load Loss, % | 22.8 | 23.4 | 21.7 |

/1/ 3-Dimethylaminopropionitrile.
/2/ The blend contained 1.5 p.b.w. of Amine Catalyst I and 0.4 p.b.w. of dimethylethanolamine.

As observed with respect to the flexible foams of the previous examples, Foams 11 and 12 exhibited a good combination of physical properties as shown by the data of Table V, and were also markedly less odorous than the control foam. As reflected by rise time, the employment of dimethylethanolamine in combination with the beta-amino nitrile provided enhanced catalytic activity.

EXAMPLES 13-19

Following Foam Procedure II, two series of molded, high-resilience foams, designated Foams 13-16 and 17-19, were prepared including respective control Foams K-3 and K-4. In preparing the series of Examples 13-16 and control Run K-3, the 2.5 × 15 × 15 inches mold and Foam Formulation C were used. In providing the foams of the second series of Examples 17-19 and control Run K-4, the 4 × 15 × 15 inches mold and Foam Formulation D were used. In each control run, N-ethylmorpholine was present in the reaction mixture whereas in forming the foams of the examples, N-ethylmorpholine was replaced with 3-dimethylaminopropionitrile alone (Examples 13 and 17) or with a blend of 3-dimethylaminopropionitrile and dimethylethanolamine (Examples 14-16, 18 and 19Upon completion of foam formation, it was observed that control Foams K-3 and K-4, as well as Foams 13-19 has good demold characteristics in that none of the foams were tender or subject to severe shrinkage when removed from the mold. However, a strong amine odor emanated from the freshly demolded control foams and, although diminishing in intensity with time, this odor persisted for several hours. On the other hand, the level of amine odor emanating from freshly demolded Foams 13-19 was low and clearly an improvement over the control foams. These and other results as well as physical property data of the respective foams are given in the following Tables VII and VIII.

TABLE VII
HIGH RESILIENCE FOAM (MOLDED)

| Example and Foam No. | — | 13 | 14 | 15 | 16 |
|---|---|---|---|---|---|
| Control Run and Foam No. | K-3 | — | — | — | — |
| Foam Formulation C | | | | | |
| N-Ethylmorpholine, p.p.h.p. | 0.80 | None | None | None | None |
| Amine Catalyst I /1/, p.p.h.p. | None | 0.80 | 0.4) /2/ | 0.47) /2/ | 0.63) /2/ |
| Dimethylethanolamine, p.p.h.p. | None | None | 0.1) | 0.13) | 0.17) |

TABLE VII-continued

| | HIGH RESILIENCE FOAM (MOLDED) | | | | |
|---|---|---|---|---|---|
| Example and Foam No. | — | 13 | 14 | 15 | 16 |
| Control Run and Foam No. | K-3 | — | — | — | — |
| Cream Time, seconds | 6 | 6 | 6 | 6 | 5 |
| Exit Time, seconds | 44 | 44 | 43 | 42 | 40 |
| Hot Foam Odor | High | Low | Low | Low | Low |
| Foam Properties | | | | | |
| Resilience, % ball rebound | 62 | 64 | 62 | 62 | 63 |
| Porosity, ft.$^3$/min./ft.$^2$ | 37 | 34.5 | 23.0 | 37.0 | 32.8 |
| Density, lbs./ft.$^3$ | 2.72 | 2.56 | 2.72 | 2.72 | 2.71 |
| ILD (2.5"), lbs./50 in.$^2$ | | | | | |
| 25% deflection | 37.0 | 36.4 | 34.4 | 35.0 | 34.4 |
| 65% deflection | 93.5 | 91.0 | 87.0 | 88.8 | 86.4 |
| 25% return | 31.1 | 30.6 | 29.1 | 29.3 | 28.9 |
| Return value, % | 84.0 | 84.1 | 84.6 | 83.7 | 84 |
| Load Ratio | 2.53 | 2.50 | 2.53 | 2.53 | 2.51 |
| Compression Sets, % | | | | | |
| 75% | 8.08 | 8.06 | 7.94 | 9.32 | 9.27 |
| 50% After Humid Aging | 18.1 | 18.6 | 19.3 | 19.4 | 19.8 |
| Tensile Strength, p.s.i. | 24.0 | 25.2 | 26.5 | 25.1 | 26.6 |
| Elongation, % | 160 | 164 | 181 | 168 | 175 |
| Tear Resistance, lbs./in. | 2.26 | 2.13 | 2.08 | 2.28 | 2.17 |
| Humid Age Load Loss, % | 28.7 | 26.6 | 24.9 | 25.9 | 25.2 |

/1/ 3-Dimethylaminopropionitrile.
/2/ Added as blend containing 1.5 p.b.w. of Amine Catalyst I and 0.4 p.b.w. of dimethylethanolamine; in Examples 14, 15 and 16, the said blend was added in an amount of 0.5, 0.6 and 0.8 p.p.h.p., respectively.

TABLE VIII

| | HIGH-RESILIENCE FOAM (MOLDED) | | | |
|---|---|---|---|---|
| Example and Foam No. | — | 17 | 18 | 19 |
| Control Run and Foam No. | K-4 | — | — | — |
| Foam Formulation D | | | | |
| N-Ethylmorpholine, p.p.h.p. | 0.80 | None | None | None |
| Amine Catalyst I /1/, p.p.h.p. | None | 0.80 | 0.4) /2/ | 0.63) /2/ |
| Dimethylethanolamine, p.p.h.p. | None | None | 0.1) | 0.17) |
| Cream Time, seconds | 6 | 6 | 6 | 6 |
| Exit Time, seconds | 45 | 48 | 47 | 42 |
| Hot Foam Odor | High | Low | Low | Low |
| Foam Properties | | | | |
| Resilience, % ball rebound | 65 | 65 | 65 | 65 |
| Porosity, ft.$^3$/min./ft.$^2$ | 43.8 | 41.2 | 37.5 | 35.5 |
| Density, lbs./ft.$^3$ | 1.89 | 1.89 | 1.87 | 1.88 |
| ILD (4"), lbs./50 in.$^2$ | | | | |
| 25% deflection | 21.4 | 21.9 | 21.8 | 21.1 |
| 65% deflection | 60.8 | 61.9 | 61.1 | 60.0 |
| 25% return | 17.4 | 17.7 | 17.4 | 16.9 |
| Return value, % | 81.3 | 80.7 | 79.7 | 80.0 |
| Load Ratio | 2.84 | 2.83 | 2.8 | 2.85 |
| Compression Sets, % | | | | |
| 75% | 10.9 | 11.3 | 11.5 | 13.3 |
| 50% After Humid Aging | 28.3 | 27.9 | 29.8 | 33.3 |
| Tensile Strength, p.s.i. | 18.5 | 19.0 | 20.0 | 20.5 |
| Elongation, % | 175 | 180 | 193 | 193 |
| Tear Resistance, lbs./in. | 1.94 | 1.97 | 1.99 | 1.89 |
| Humid Age Load Loss, % | 26.5 | 25.8 | 20.3 | 23.6 |

/1/ 3-Dimethylaminopropionitrile.
/2/ Added as blend containing 1.5 p.b.w. of Amine Catalyst I and 0.4 p.b.w. of dimethylethanolamine; in Examples 18 and 19, the said blend was added in an amount of 0.5 and 0.8 p.p.h.p., respectively.

The results of Tables VII and VIII show that the improvement of low residual odor afforded by the catalysts of this invention is achieved without substantial sacrifice of the good overall combination of physical properties possessed by the control foam.

EXAMPLES 20-25

In accordance with these examples, a series of flexible polyester poly-based polyurethane foams were prepared employing amine catalyst systems containing the beta-amino nitriles described herein and silicon-free, organic surfactants as the foam stabilizing components. In Examples 20-22, Amine Catalysts I-III were employed as the respective sole catalytic amine components of the reaction mixture. In Examples 23-25, Amine catalyst I was used in combination with dimethylethanolamine, the reaction mixtures of Examples 24 and 25, also containing the co-catalyst, hexadecyldimethylamine. As a control (Run K-5), N-ethylmorpholine was used in combination with hexadecyldimethylamine. The other components of the reaction mixture, designated herein as Foam Formulation E, are given in Table IX which follows.

TABLE IX

| FOAM FORMULATION E | |
|---|---|
| Component | Parts By Weight |
| Polyol E: A polyester polyol produced from adipic acid, diethylene glycol and trimethylolpropane in a mole ratio of approximately 1:1:0.2, and having a Hydroxyl No. of about 50 to 56, a molecular weight of about 2000, an acid number not greater than 2 and a viscosity of about 17,000 centistokes at about 25° C. This partiuclar polyester resin is sold under the name "Witco Fomrez No. 50". | 100 |
| Polyisocyanate A /1/ (Index = 105) | 45.1 |
| Water | 3.6 |
| Surfactant E: Sulfated or sulfonated fatty acid ester produced by reacting propylene oxide and ethylene oxide with a fatty acid to produce an ester and then sulfating or sulfonating the ester, sold under the name "Witco Fomrez 77–86." | 1.4 |
| Surfactant F: Reaction product of oleic acid and diethylamine, sold under the name "Mobay A-3". | 1.3 |
| Amine Catalysts | |
| N-Ethylmorpholine or Amine Catalysts I, II and III | Varied |
| Dimethylethanolamine | Varied |
| Hexadecyldimethylamine | Varied |

/1/ As defined in Table I.

The foams of Examples 20-25 and control Run K-5 were prepared in accordance with Foam Procedure III; each of the respective aqueous premixtures of surfactants, amine catalyst or catalysts were clear solutions. The relative proportion of amine catalysts employed and the results are given in the following Table X.

TABLE X

| | POLYESTER POLYOL-BASED FOAM | | | | | | |
|---|---|---|---|---|---|---|---|
| Example and Foam No. | — | 20 | 21 | 22 | 23 | 24 | 25 |
| Control Run and Foam No. | K-5 | — | — | — | — | — | — |
| Foam Formulation E | | | | | | | |
| Amine Catalyst, p.p.h.p. | | | | | | | |

TABLE X-continued

| | POLYESTER POLYOL-BASED FOAM | | | | | | |
|---|---|---|---|---|---|---|---|
| Example and Foam No. | — | 20 | 21 | 22 | 23 | 24 | 25 |
| Control Run and Foam No. | K-5 | — | — | — | — | — | — |
| N-Ethylmorpholine | 2.0 | — | — | — | — | — | — |
| Amine Catalyst I /1/ | — | 2.0 | — | — | 1.5 | 1.5 | 1.5 |
| Amine Catalyst II /2/ | — | — | 2.0 | — | — | — | — |
| Amine Catalyst III /3/ | — | — | — | 2.0 | — | — | — |
| Dimethylethanolamine | — | — | — | — | 0.4 | 0.4 | 0.4 |
| Hexadecyldimethylamine | 0.3 | — | — | — | — | 0.3 | 0.6 |
| Cream Time, seconds | 13 | 14 | 30 | 50 | 14 | 12 | 10 |
| Rise Time, seconds | 81 | 119 | 300 | 350 | 88 | 80 | 71 |
| Breathability, SCFM | 1.55 | — | — | — | — | 0.75 | 0.80 |
| Foam Density, lbs./ft.$^3$ | 1.93 | — | — | — | — | 2.03 | 1.94 |
| Foam Odor | strong amine odor | low | low | low | low | low | low |
| Foam Split | none | yes | yes | yes | yes | none | none |

/1/ 3-Dimethylaminopropionitrile.
/2/ 3-Diethylaminopropionitrile.
/3/ 3-(4-Morpholino)propionitrile.

The results of Table X show that the beta-amino nitriles are catalytically effective in producing flexible polyester urethane foams and that their activity in this respect, as reflected by rise time, is substantially increased by their employment in combination with dimethylethanolamine (Examples 23-25). The results of Examples 24 and 25 further show that foam splitting can be avoided by the use of hexadecyldimethylamine which was also present in the control formulation. In each instance, the foams produced in the presence of the beta-amino nitrile catalysts had low residual odor in contrast to the control foam which had a strong amine odor characteristic of N-ethylmorpholine.

EXAMPLES 26-32

Following Foam Procedure IV, a series of machine scale flexible polyester polyol-based foam slabs, including control Foams K-6 to K-8, were produced at a throughput of about 60-70 pounds of foam per minute employing Foam Formulation E. As indicated by Foam Procedure IV, the activator feed stream was an aqueous premixture of amine catalyst and foam stabilizing surfactants which, in Foam Formulation E, were silicon-free organic surfactants. In the control activator streams, the amine catalysts were N-ethylmorpholine alone (K-6) or in combination with hexadecyldimethylamine (K-7 and K-8). In Example 26, the activator stream contained 3-dimethylaminopropionitrile in combination with dimethylethanolamine, and, in Examples 27-32, hexadecyldimethylamine was also present. In Examples 26-30, the 3-dimethylaminopropionitrile and dimethylethanolamine were added to the activator stream as a blend containing 1.5 and 0.4 parts by weight of these two components, respectively, whereas in Examples 31 and 32, they were added individually. The respective relative proportions of amine catalysts employed in these examples and the control runs are given in Table XI. In each instance, the aqueous activator streams which also contained organic Surfactants E and F of Formulation E, were clear and easily pumped solutions. The results and foam physical property data are also included in Table XI which follows.

TABLE XI

| | POLYESTER POLYOL-BASED FOAM (Machine Runs) | | | | | | | | | |
|---|---|---|---|---|---|---|---|---|---|---|
| Example and Foam No. | — | — | — | 26 | 27 | 28 | 29 | 30 | 31 | 32 |
| Run and Foam No. | K-6 | K-7 | K-8 | — | — | — | — | — | — | — |
| Foam Formulation E | | | | | | | | | | |
| Amine Catalysts, p.p.h.p. | | | | | | | | | | |
| N-Ethylmorpholine | 2.0 | 2.0 | 2.0 | — | — | — | — | — | — | — |
| Amine Catalyst I /1,2/ | — | — | — | 1.6 | 1.6 | 1.6 | 1.2 | 2 | 1.50 | 1.50 |
| Dimethylethanolamine /2/ | — | — | — | 0.4 | 0.4 | 0.4 | 0.3 | 0.5 | 0.35 | 0.45 |
| Hexadecyldimethylamine | 0.0 | 0.15 | 0.3 | — | 0.15 | 0.3 | 0.3 | 0.3 | 0.3 | 0.3 |
| Cream Time, seconds | 4 | 3 | 2.5 | 3 | 3.5 | 3 | 4 | 2 | 3 | 3 |
| Rise Time, seconds | 67 | 61 | 60 | 65 | 62 | 61 | 68 | 57 | 62 | 59 |
| Gel Time, seconds | 93 | 83 | 87 | 95 | 93 | 93 | 95 | 79 | 91 | 86 |
| Activator Solubility | | | | | | Clear | | | | |
| Foam Properties | | | | | | | | | | |
| Foam density, lbs./ft.$^3$ | 1.82 | | 1.79 | 1.89 | 1.82 | 1.85 | 1.70 | 1.75 | | 1.80 |
| Breathability, SCFM | 0.5 | | 0.3 | 0.7 | 0.6 | 0.4 | 0.8 | 0.6 | | 0.75 |
| ILD(4"), lbs./50 in.$^2$ | | | | | | | | | | |
| 25% | 51 | | 48 | 63 | 59 | 58 | 51 | 57 | | 61 |
| 65% | 91 | | 93 | 104 | 97 | 103 | 83 | 93 | | 95 |
| 25% return | 28 | | 25 | 32 | 30 | 30 | 26 | 29 | | 30 |
| Compression Sets, % | | /3/ | | | | | | | /3/ | |
| 75% | — | | 18.0 | — | — | — | — | — | | — |
| 90% | 14.4 | | 26.0 | 17.0 | 12.4 | 21.1 | 10.3 | 10.9 | | 11.0 |
| Tensile strength, p.s.i. | 31.1 | | 28.9 | 31.1 | 32.4 | 28.6 | 31.7 | 31.1 | | 26.9 |
| Elongation, % | 347 | | 330 | 359 | 360 | 307 | 427 | 416 | | 362 |
| Tear Resistance, lbs./in. | 3.6 | | 3.1 | 4.8 | 4.7 | 3.6 | 4.8 | 5.0 | | 4.7 |

/1/ 3-Dimethylaminopropionitrile.
/2/ In Examples 26-30, Amine Catalyst I and dimethylethanolamine were added as a blend containing 1.5 and 0.4 p.b.w. of said components, respectively; the said blend was added in an amount of 2.0 p.p.h.p. (Examples 26-28), 1.5 p.p.h.p. (Example 29) and 2.5 p.p.h.p. (Example 30).
/3/ Foam quality satisfactory; physical properties not determined.

The results of Examples 26-32 further demonstrate that, in addition to allowing for the formation of flexible polyester-based foams of low residual odor and satisfactory quality, the beta-amino nitrile catalysts described herein allow for the formation of activator streams containing silicon-free organic foam stabilizers which have the processing advantage of being readily pumped. In this respect it is noted that, although the beta-amino nitrile catalyst alone (as in Examples 20-22 of Table X) or in combination with dimethylethanolamine in the relative proportions employed in Examples 23-25 of Table X and Examples 26-32 of Table XI, provided activator streams which did not gel, the presence of dimethylethanolamine in the activator stream as the sole principal amine catalyst or as the major amine component relative to the beta-amino nitrile catalyst, causes gellation as shown by the data of the following Example 33.

EXAMPLE 33

A series of activator streams containing the same organic surfactant components of Foam Formulation E (Table IX) were prepared based on 3-dimethylaminopropionitrile alone (Amine Catalyst I), dimethylethanolamine (DMEA) alone, and various blends of these two catalysts. The activator formulation and the order of addition of each component, which was also the order of addition employed in preparing the activator streams of Examples 20-32, were as indicated in Table XII.

TABLE XII
ACTIVATOR STREAMS

| Component | Parts By Weight | Order Of Addition |
|---|---|---|
| Water | 3.6 | 1 |
| Surfactant E /1/ | 1.4 | 2 |
| Surfactant F /1/ | 1.3 | 4 |
| Amine Catalyst I, DMEA or Blend thereof | 2.0 | 3 |
| Hexadecyldimethylamine | 0.3 | 5 |

/1/ As defined in Table IX.

Following the above order of addition, six activator streams were prepared. In preparing Streams 1 and 6, Amine Catalyst I and dimethylethanolamine were the sole respective components added in Step 3. In preparing Streams 2-5, these two catalysts were added in Step 3 in preblended form, the various blends as such being clear solutions. The weight percentages of Amine Catalyst I and dimethylethanolamine contained in the respective blends, as well as the results are given in Table XIII. The particular blend added in the preparation of Stream 2 corresponds to the blend containing 1.5 and 0.4 parts by weight of Amine Catalyst I and dimethylethanolamine, respectively, employed in the preparation of the flexible polyester foams of above-described Examples 26-30.

TABLE XIII

| Stream No. | Weight Percent /1/ Amine Catalyst I | DMEA /2/ | Activator Solubility |
|---|---|---|---|
| 1 | 100 | 0 | clear |
| 2 | 78.9 | 21.1 | clear |
| 3 | 50 | 50 | increased viscosity; approached gellation |
| 4 | 25 | 75 | gelled /3/ |
| 5 | 10 | 90 | gelled /3/ |
| 6 | 0 | 100 | gelled /3/ |

/1/ Based on combined weight of Amine Catalyst I and DMEA added to activator stream in Step 3 of Table XII.
/2/ Dimethylethanolamine.
/3/ Gellation occurred after the addition of Surfactant F (Step 4) and thus hexadecyldimethylamine was not added, the mixtures having become unworkable after Step 4.

The results of Table XIII indicate that, with respect to the preparation of flexible polyester polyurethane foams stabilized with organic surfactants, aqueous activator streams which do not gel are provided by the employment of the beta-amino nitrile catalyst alone or in combination with no more than 50 weight percent of dimethylethanolamine, based on the combined weight of these two catalysts. The data also show that clear, readily pumped solutions are provided employing less than 50 weight percent of dimethylethanolamine relative to the nitrile.

EXAMPLES 34-36

Following Foam Procedure IV, a series of machine scale flexible polyester urethane foams were prepared employing a reaction mixture, designated herein as Foam Formulation F, the foam stabilizing component of which contained an organosilicone surfactant. The nature of the foam stabilizer (Surfactant G) and the other components of Foam Formulation F are given in Table XIV below. In each example, the activator stream contained water, Surfactant G and 3-dimethylaminopropionitrile and dimethylethanolamine, the latter catalysts being added to the activator stream in preblended form. The respective activator streams employed in Examples 35 and 36 also contained the co-catalyst, hexadecyldimethylamine. In each instance, the activator stream was a cloudy solution and was easily pumped. The results and foam physical property data are also included in Table XIV which follows.

TABLE XIV
POLYESTER POLYOL-BASED FOAMS (Machine Runs)

| Example and Foam No. | 34 | 35 | 36 |
|---|---|---|---|
| Foam Formulation F, Parts By Weight | | | |
| Polyol E /1/ | 100 | 100 | 100 |
| Polyisocyanate A /2/ (Index=105) | 45.2 | 45.2 | 45.2 |
| Water | 3.6 | 3.6 | 3.6 |
| Surfactant G /3/ | 1.0 | 1.0 | 1.0 |
| Blend of Amine Catalyst I (1.5 p.b.w.) and dimethylethanolamine (0.4 p.b.w.) | 1.9 | 1.9 | 1.9 |
| Hexadecyldimethylamine | 0.0 | 0.3 | 0.5 |
| Cream Time, seconds | 3 | 3 | 3 |
| Rise Time, seconds | 66 | 60 | 57 |
| Gel Time, seconds | 90 | 72 | — |
| Foam Properties | | | |
| Foam density, lbs./ft.$^3$ | 1.80 | 1.65 | 1.72 |
| Breathability, SCFM | 0.75 | 0.9 | 1.4 |
| ILD (4"), lbs./50 in.$^2$ | | | |
| 25% | 65 | 52 | 57 |
| 65% | 108 | 87 | 93 |
| 25% return | 33 | 27 | 28 |
| Compression Sets, % | | | |
| 50% | 14.5 | — | — |
| 75% | 21.3 | — | 11.2 |
| 90% | 70.4 | 10.7 | 22.7 |
| Tensile strength, p.s.i. | 30.5 | 32.9 | 28.5 |
| Elongation, % | 319 | 451 | 342 |
| Tear Resistance, lbs./in. | 4.1 | 4.4 | 4.1 |

/1/ As defined in Table IX.
/2/ As defined in Table I.
/3/ A solution containing: (a) 35 weight percent of a polysiloxane-polyoxyalkylene block copolymer having the average composition, Me$_3$SiO(Me$_2$SiO)$_{5.1}$[MeO(C$_2$H$_4$O)$_{7.2}$C$_3$H$_6$Si(Me)O]$_{7.5}$SiMe$_3$, where Me is methyl; (b) 35 weight percent of a sodium sulfonate of a petroleum hydrocarbon mixture, sold under the name "Bryton 430"; (c) 15 weight percent Tall Oil; (d) 15 weight percent hexylene glycol; and (e) 2500 parts per million, based on (a)-(d) of "Ionol".

The results of Table XIV further illustrate the versatility of the beta-amino nitriles described herein as catalysts in the formation of a wide variety of cellular polyurethanes. From the standpoint of flexible polyester polyol-based urethane foam manufacture, the data of Table XIV, as well as the results of Examples 26-33, amply demonstrate that the use of the beta-amino nitriles in combination with dimethylethanolamine offers a particularly desirable combination of properties in that such combinations have excellent catalytic activity for the water-isocyanate reaction, allow for the formation of workable activator streams containing either silicon-free or silicon-containing foam-stabilizers, and provide foam products free of a strong amine odor. As reflected by the foam physical properties, the quality of the foam products was also good. Although the polyester foams of Examples 20—25 (Table X) were of uniform color, it was observed that the larger machine scale foam buns of Examples 26-32 (Table XI) and Examples 34-36 (Table XIV) were scorched towards the center of the buns and that such scorching is not inhibited by the presence in the beta-amino nitrile/dimethylethanolamine blend, of 500 parts per million (p.p.m.) of propylene oxide in combination with (1) triphenylphosphite (200-600 p.p.m.) or (2) up to 2500 p.p. m. of "Ionol" or p-methoxyphenol. Discoloration of the large foam buns was also observed when the blend contained 1000 p.p.m. of each of propylene oxide and triphenylphosphite. The observed scorching did not cause degradation of the physical foam properties and thus the polyester foams of Examples 26-32 and 34-36 are useful in the aforementioned applications where non uniform color is not a significant factor. In addition to the above-discussed desirable combination of properties exhibited by 3-dimethylaminopropionitrile in combination with dimethylethanolamine, it has been found that the beta-amino nitrile in combination with bis[2-(N,N-dimethylamino)ethyl]ether offers the further advantage of providing polyester foam buns at least on a semi-commercial scale which are scorch-free. This embodiment of the present invention is illustrated by data included in the following series of Examples.

EXAMPLS 37-40

In accordance with these examples, additional flexible polyester urethane foam slabs were provided following Foam Procedure IV and employing as the principal tertiary amine catalyst, 3-dimethylaminopropionitrile (Amine Catalyst I) alone as in Example 40, or preblended with either bis [2-(N,N-dimethylamino)ethyl]ether or dimethylethanolamine as in Examples 37-39. The blend (2.0 p.p.h.p.) employed in Examples 37 and 38 contained 1.5 p.b.w. of Amine Catalyst I and 0.1 p.b.w. of the said bis-ether. The blend (2.0 p.p.h.p.) employed in Example 39 contained 1.5 p.b.w. of Amine Catalyst I and 0.4 p.b.w. of dimethylethanolamine. Control Foams K-9 to K-11 were also made employing N-ethylmorpholine as the principal tertiary amine catalyst. For the purpose of comparison, a further foam was prepared employing dimethylethanolamine alone (Run C-3) as the principal catalyst. In these foam preparations, the other components of respective reaction mixtures, designated Foam Formulations G and H, were as indicated in Table XV below. The polyol, polyisocyanate and foam stabilizing components of these foam formulations correspond to those of Foam Formulations E and F of Tables IX and XIV, respectively. It should be noted, however, that Foam Formulation H is more higly exothermic than Foam Formulation F in that the water content (5 p.p.h.p.) and polyisocyanate Index (115) were significantly higher. The various foams were produced at a rate of 60 pounds of foam per minute adding, as previously described, the following three individual streams: (1) the polyester polyol, (2) the polyisocyanate, and (3) the activator containing water, the principal amine catalyst(s), hexadecyldimethylamine co-catalyst and organic Surfactants E and F or organosilicone-containing Surfactant G as foam stabilizers. Except for the N-ethylmorpholine employed in Control Runs K-9 to K-11, no scorch-inhibiting additives were employed. The N-ethylmorpholine employed in these, as well as in the other control runs included herein, contained "Ionol" (200 p.p.m.) and propylene oxide (500 p.p.m.) inhibitors which are routinely added to this catalyst. The composition of the reaction mixtures and the results, including foam physical property data and observations as to whether or not the foams were scorched, are given in Table XV which follows.

TABLE XV

| POLYESTER POLYOL-BASED FOAMS (Machine Runs) | | | | | | | | |
|---|---|---|---|---|---|---|---|---|
| Example and Foam No. | — | 37 | — | 38 | 39 | — | — | 40 |
| Run and Foam No. | K-9 | — | K-10 | — | — | K-11 | C-3 | — |
| Foam Formulation, Pts. by Weight | G | | | | H | | | |
| Polyol E /1/ | 100 | 100 | 100 | 100 | 100 | 100 | 100 | 100 |
| Polyisocyanate A /1/ | 45.2 | 45.2 | 64.8 | 64.8 | 64.8 | 64.8 | 64.8 | 64.8 |
| Index | 105 | 105 | 115 | 115 | 115 | 115 | 115 | 115 |
| Water | 3.6 | 3.6 | 5.0 | 5.0 | 5.0 | 5.0 | 5.0 | 5.0 |
| Surfactant E /1/ | 1.4 | 1.4 | — | — | — | — | — | — |
| Surfactant F /1/ | 1.3 | 1.3 | — | — | — | — | — | — |
| Surfactant G /2/ | — | — | 1.0 | 1.0 | 1.0 | 1.0 | 1.0 | 1.0 |
| Hexadecyldimethylamine | 0.3 | 0.3 | 0.3 | 0.3 | 0.3 | 0.3 | 0.3 | 0.3 |
| N-Ethylmorpholine | 2.0 | — | 2.0 | — | — | 2.0 | — | — |
| Amine Catalyst I /3/ | — | 1.875 | — | 1.875 | 1.58 | — | — | 3.0 |
| Bis[2-(N,N-dimethylamino)ethyl]ether | — | 0.125 | — | 0.125 | — | — | — | — |
| Dimethylethanolamine | — | — | — | — | 0.42 | — | 0.7 | — |
| Cream Time, seconds | 6 | 5 | 8 | 6 | 6 | 5 | 7 | 6 |
| Rise Time, seconds | 62 | 62 | 58 | 56 | 55 | 56 | 60 | 60 |
| Gel Time, seconds | 85 | 85 | 75 | 75 | 75 | 75 | 80 | 125 |
| Activator Solubility | clear | clear | clear | clear | cloudy | clear | — | — |
| Foam Properties | | | | | | | | |
| Foam density, lbs./ft.³ | 1.61 | 1.67 | 1.23 | 1.23 | 1.28 | 1.28 | 1.25 | 1.33 |
| Breathability, SCFM | 0.5 | 0.9 | 0.4 | 0.3 | 0.8 | 0.3 | 0.4 | 0.5 |
| ILD (4"), lbs./50 in.² | | | | | | | | |
| 25% | 43 | 41 | 50 | 48 | 58 | 53 | 56 | 50 |
| 65% | 68 | 65 | 91 | 81 | 95 | 92 | 97 | 85 |
| 25% Return | 22 | 23 | 27 | 25 | 26 | 30 | 25 | 26 |
| Compression Sets, % | | | | | | | | |
| 90% | 9.1 | 10.4 | 25.6 | 85.6 | 86.6 | 49.5 | 93.2 | 56.9 |
| 50% | — | — | 13.3 | 18.9 | 51.3 | 14.4 | — | 17.0 |
| Tensile Strength, p.s.i. | 22.4 | 20.9 | 17.0 | 18.7 | 20.0 | 18.4 | 20.1 | 18.3 |
| Elongation, % | 309 | 286 | 100 | 132 | 149 | 94 | 140 | 144 |
| Tear Resistance, lbs./in. | 3.0 | 2.7 | 1.7 | 1.9 | 2.3 | 1.5 | 2.3 | 2.5 |

TABLE XV-continued

| | POLYESTER POLYOL-BASED FOAMS (Machine Runs) | | | | | | | |
|---|---|---|---|---|---|---|---|---|
| Example and Foam No. | — | 37 | — | 38 | 39 | — | — | 40 |
| Run and Foam No. | K-9 | — | K-10 | — | — | K-11 | C-3 | — |
| Observations as to Scorching | None | None | None | None | Yes | None | Yes | None |

/1/ As defined in Table IX.
/2/ As defined in Table XIV.
/3/ 3-dimethylaminopropionitrile.

The results of Table XV indicate that the various foam products had an overall good combination of physical properties. Several side splits were observed in Foam No. 40 which condition is believed attributable to the comparatively low concentration of hexadecyldimethylamine co-catalyst relative to the concentration of Amine Catalyst I. The results of Table XV demonstrate that the combination of Amine Catalyst I and bis[2-(N,N-dimethylamino)ethyl]ether is an especially outstanding catalyst system for flexible polyester polyol-based urethane foam formation in that the activity was excellent, the activator streams were clear, overall foam physical properties were good, the foams were free of residual amine odor and were also scorch-free. The latter condition also existed with respect to Foam No. 40 in which Amine Catalyst I was used as the sole principal amine catalyst but was in contrast to the scorching observed in comparative Run C-3 and in Example 39 in which the respective reaction mixtures contained dimethylethanolamine alone or in combination with Amine Catalyst I.

EXAMPLES 41-46

In accordance with these examples, blends of 3-dimethylaminopropionitrile and bis[2-(N,N-dimethylamino)ethyl]ether were employed as the primary catalytic amine components of polyester polyol-based Foam Formulation F (Table XIV) and Foam Formulation G (Table XV). For convenience, the formulations are summarized in Table XVI below. In preparing these foams, as well as Control Foams K-12 to K-14 in which N-ethylmorpholine (2.0 p.p.h.p.) was used as the principal catalyst, Foam Procedure III was followed except that in Example 44 and Control Run K-14, the activator streams had been aged 18 hours prior to use. In the examples, 2.0 p.p.h.p. of the aforesaid catalyst blends was employed. The composition of the blends and the results are also given in Table XVI which follows.

TABLE XVI

| | POLYESTER POLYOL-BASED FOAM | | | | | | | | |
|---|---|---|---|---|---|---|---|---|---|
| Example and Foam No. | — | 41 | — | 42 | 43 | — | 44 | 45 | 46 |
| Control Run and Foam No. | K-12 | — | K-13 | — | — | K-14 | — | — | — |
| Foam Formulation, Pts. by Wt. | | | F | | | | G | | |
| Polyol E /1/ | | | 100 | | | | 100 | | |
| Polyisocyanate A /2/ (Index = 105) | | | 45.2 | | | | 45.2 | | |
| Water | | | 3.6 | | | | 3.6 | | |
| Surfactant E /1/ | | | 0.0 | | | | 1.4 | | |
| Surfactant F /1/ | | | 0.0 | | | | 1.3 | | |
| Surfactant G /3/ | | | 1.0 | | | | 0.0 | | |
| Hexadecyldimethylamine | | | 0.3 | | | | 0.3 | | |
| N-Ethylmorpholine | 2.0 | — | 2.0 | — | — | 2.0 | — | — | — |
| Blend of Amine Catalyst I and Bis-Ether /4/ | — | 2.0 | — | 2.0 | 2.0 | — | 2.0 | 2.0 | 2.0 |
| Amine Catalyst I, Wt. % /5/ | — | 93.75 | — | 95.0 | 96.0 | — | 93.75 | 95.0 | 96.0 |
| Bis-Ether, Wt. % /5/ | — | 6.25 | — | 5.0 | 4.0 | — | 6.25 | 5.0 | 4.0 |
| Activator Solubility | Clear | Clear | Clear | Clear | Clear | Clear | Clear | Clear | Clear |
| Cream Time, seconds | 12 | 11 | 11 | 11 | 11 | 12 | 12 | 13 | 13 |
| Rise Time, seconds | 74 | 66 | 69 | 70 | 73 | 85 | 89 | 88 | 92 |
| Height of Rise, inches | 5.5 | 5.3 | 5.5 | 5.3 | 5.1 | 5.3 | 5.0 | 4.9 | 5.0 |
| Foam Properties | | | | | | | | | |
| Foam Density, lbs./ft.$^3$ | 1.85 | 1.85 | 1.82 | 1.90 | 1.91 | 1.93 | 2.02 | 1.99 | 1.99 |
| Breathability, SCFM | 1.15 | 0.9 | 1.35 | 0.55 | 0.8 | 1.1 | 0.8 | 0.9 | 1.45 |
| Cells Per Inch | 45-50 | 50-55 | 45-50 | 50-55 | 50-55 | 40-45 | 40-45 | 40-45 | 45-50 |

/1/ As defined in Table IX.
/2/ As defined in Table I.
/3/ As defined in Table XIV.
/4/ Bis[2-(N,N-dimethylamino)ethyl]ether.
/5/ The weight percentages are based on the combined weight of Amine Catalyst I and bis[2-(N,N-dimethylamino)ethyl]ether contained in said blend.

The results of Table XVI demonstrate that blends of 3-dimethylaminopropionitrile and the bis-ether have good activity and provide foams having properties which compare favorably with the control foams formed in the presence of N-ethylmorpholine. Inasmuch as Foam Nos. 41 to 46 had low residual odor, it is evident that such blends are also used with advantage as direct replacements for N-ethylmorpholine in forming flexible polyester foams stabilized with surfactants of either the organic or organosilicone variety.

EXAMPLE 47

In accordance with this example, a series of activator streams containing organic foam stabilizers were prepared based on 3-dimethylaminopropionitrile alone, bis[2-(N,N-dimethylamino)ethyl]ether alone, and various blends of these two catalysts. The components of the activator formulation and the order in which each component was added, which was also the order of addition employed in preparing the activator streams of Examples 37-46, were as indicated in the following Table XVII.

TABLE XVII

| ACTIVATOR STREAMS | | |
|---|---|---|
| Component | Parts By Weight | Order of Addition Step No. |
| Water | 3.6 | 1 |
| Surfactant E /1/ | 1.4 | 2 |
| Amine Catalyst I, Bis-ether, | Varied | 3 |

TABLE XVII-continued

ACTIVATOR STREAMS

| Component | Parts By Weight | Order of Addition Step No. |
|---|---|---|
| or blend thereof | | |
| Surfactant H /2/ | 1.3 | 4 |
| Hexadecyldimethylamine | 0.3 | 5 |

/1/ As defined in Table IX.
/2/ Reaction product of oleic acid and diethylamine, sold under the name "Witco 1058".

Following the above order of addition, eight activator streams were prepared. In preparing Streams 1 and 8, the bis[2-(N,N-dimethylamino)ethyl]ether and 3-dimethylaminopropionitrile (Amine CatalystI) were the sole respective components fed to Step 3. The concentration of the bis-ether (0.25 p.b.w.) and Amine Catalyst I (2.0 p.b.w.) employed in forming Streams 1 and 8 were selected on the basis of their respective catalytic activity in polyester polyol-based formulations. Thus, 0.25 p.p.h.p. of the bis-ether and 2.0 p.p.h.p. of Amine Catalyst I are adequate respective concentrations to obtain desired reactivity patterns whereas 2.0 p.p.h.p. of the bis-ether, although providing a liquid activator stream, is above a practical concentration from the standpoint of desired reactivity. In preparing Streams 2 through 7, Amine Catalyst I and the bis-ether were fed to Step 3 in preblended form in the amounts indicated in Table XVIII below, the various blends as such being clear solutions. The weight percentages of Amine Catalyst I and the bis-ether contained in the respective blends and the results are also given in Table XVIII which follows.

stabilized with organic surfactants as typically illustrated by Surfactants E and H, gellation of the activator stream occurs when the bis-ether is present as the sole primary catalytic component at an otherwise useful concentration thereof as in Stream 1. Although Stream 2 did not gel, the mixture was extremely viscous. On the other hand, more workable and thus preferred activator streams are provided by maintaining the concentration of the beta-amino nitrile at a high level relative to the bis-ether, that is, at a level not substantially below about 90 weight percent as in Streams 3 through 7.

EXAMPLES 48-52

Following Foam Procedure III, a series of flexible polyester polyol-derived urethane foams was prepared employing Foam Formulation E except that: (1) the concentration of hexadecyldimethylamine co-catalyst was maintained at 0.3 p.p.h.p., and (2) the other Amine Catalyst components were either N-ethylmorpholine (Control Runs K-15 and K-16) or respective blends of Amine Catalyst I with triethylenediamine, 3-dimethylamino-N,N-dimethylpropionamide, bis[2-(N,N-dimethylamino)ethyl]ether or 1,4-dimethylpiperazine. In Table XIX below, the composition of the respective blends as added to the formulation are expressed in weight percent, based on the combined weight of Amine Catalyst I and the aforesaid amines contained in the blend. The results of these foam preparations are also included in Table XIX which follows.

TABLE XIX

| Example and Foam No. | — | 48 | 49 | 50 | — | 51 | 52 |
|---|---|---|---|---|---|---|---|
| Control Run and Foam No. | K-15 | — | — | — | K-16 | — | — |
| Foam Formulation E /1/ | | | | | | | |
| Amine Catalysts, p.p.h.p. | | | | | | | |
| Hexadecyldimethylamine | 0.3 | 0.3 | 0.3 | 0.3 | 0.3 | 0.3 | 0.3 |
| N-Ethylmorpholine | 2.0 | — | — | — | 2.0 | — | — |
| Blend of Amine Catalyst I | — | 2.0 | 2.0 | 2.0 | — | 2.0 | 2.0 |
| Amine Catalyst I, wt. % | — | 95 | 78.9 | 95 | — | 90 | 95 |
| Triethylenediamine, wt. % | — | 5 | — | — | — | — | — |
| $(CH_3)_2N—CH_2CH_2—C(O)N(CH_3)_2$, wt.% | — | — | 21.1 | — | — | — | — |
| $[(CH_3)_2N-CH_2CH_2]_2O$, wt. % | — | — | — | 5 | — | — | 5 |
| 1,4-Dimethylpiperazine, wt. % | — | — | — | — | — | 10 | — |
| Cream Time, seconds | 12 | 11 | 12 | 12 | 12 | 12 | 12 |
| Rise Time, seconds | 77 | 69 | 72 | 82 | 80 | 85 | 82 |
| Height of Rise, inches | 5.5 | 5.4 | 5.5 | 5.4 | 5.6 | 4.8 | 5.0 |
| Foam Properties | | | | | | | |
| Breathability, SCFM | 1.15 | 1.60 | 0.60 | 1.20 | 1.0 | 0.75 | 1.0 |
| Cells per Inch | 25–40 | 35–40 | 40–45 | 40–45 | 35–40 | 35–40 | 40–45 |
| Foam Density, lbs./ft.$^3$ | 1.80 | 1.83 | 1.85 | 1.83 | 1.84 | 1.98 | 1.89 |

/1/ The other components and relative proportions thereof are as defined in Table IX.

The data of Table XIX demonstrate that Amine Catalyst I in combination with triethylenediamine, the beta-tert-amino carbonyl compound typically illustrated by 3-dimethylamino-N,N-dimethylpropionamide, 1,4-

TABLE XVIII

ACTIVATOR SOLUBILITY

| Stream No. (Example 47) | 1 | 2 | 3 | 4 | 5 | 6 | 7 | 8 |
|---|---|---|---|---|---|---|---|---|
| Weight Percent /1/ | | | | | | | | |
| Bis-Ether | 100 | 27.5 | 11.1 | 9.2 | 7.7 | 5.1 | 4.0 | 0 |
| Amine Catalyst I | 0 | 72.5 | 88.9 | 90.8 | 92.3 | 94.9 | 96.0 | 100 |
| Parts By Weight /2/ | | | | | | | | |
| Bis-Ether | 0.25 | 0.19 | 0.125 | 0.112 | 0.10 | 0.075 | 0.0625 | 0 |
| Amine Catalyst I | 0 | 0.50 | 1.0 | 1.10 | 1.20 | 1.40 | 1.5 | 2.0 |
| Activator Solubility | gel | extremely viscous | viscous | viscous | cloudy low viscosity | clear | clear | clear |

/1/ Based on the combined weight of bis[2-(N,N-dimethylamino)ethyl]ether and 3-dimethylaminopropionitrile (Amine Catalyst I) added in Step 3 of Table XVII.
/2/ Fed to activator stream in Step 3 of Table XVII.

The results of Table XVIII show that, with respect to the preparation of flexible polyester polyurethane foams dimethylpiperazine and the bis-ether, has good reactivity for flexible urethane foam formation and allows for the formation of good quality foam products.

EXAMPLES 53-57

The purpose of these examples is to illustrate the reactivity of the beta-amino nitrile in combination with bis[2-(N,N-dimethylamino)ethyl]ether in forming flexible polyether polyol-based foams (Examples 53-55) and as a direct replacement for N-ethylmorpholine in a high-resilience foam formulation (Examples 56-57). In Examples 53-55, a blend containing 94.1 and 5.9 weight percent of Amine Catalyst I and the bis-ether, respectively, was employed as the Amine Catalyst component of Foam Formulation A (Table I) and Foam Formulation B (Table IV). In Examples 56-57, the said blend was used as the Amine Catalyst component which was varied in high-resilience Foam Formulation C of Table VI. The foams of Examples 53-54 (and control Foams K-17 and K-18) were prepared following free-rise Foam Procedure I. The high-resilience foams of Examples 56-57 (and control Foam K-19) were prepared following Foam Procedure II employing the 2.5 mold. The relative proportion of the blended catalysts (and of N-ethylmorpholine used in the control runs) which was added to the respective formulations, as well as the results, are given in Table XX which follows.

TABLE XX

| Example No. | — | 53 | 54 | — | 55 | — | 56 | 57 |
|---|---|---|---|---|---|---|---|---|
| Control Run No. | K-17 | — | — | K-18 | — | K-19 | — | — |
| Foam Formulation | A /1/ | | | B /2/ | | C /3/ | | |
| Amine Catalyst, p.p.h.p. | | | | | | | | |
| N-Ethylmorpholine | 0.8 | — | — | 0.8 | — | 0.8 | — | — |
| Blend of Amine Catalyst I and Bis-Ether | — | 0.8 | 0.7 | — | 0.7 | — | 0.6 | 0.5 |
| Cream Time, seconds | 10 | 9 | 10 | 8 | 7 | 6 | 6 | 6 |
| Rise Time, seconds | 85 | 78 | 82 | 82 | 79 | — | — | — |
| Exit Time, seconds | — | — | — | — | — | 42 | 38 | 41 |
| Foam Odor | High | Low | Low | High | Low | High | Low | Low |
| Foam Quality | Good | Good | Good | Good | Good | Good | Good | Good |
| | | | | | | | | Slight Tightness |

/1/ As defined in Table I.
/2/ As defined in Table IV.
/3/ As defined in Table VI including Amine Catalysts A and B defined therein.

The results of Table XX demonstrate that, as compared with N-ethylmorpholine, the improvement of low residual amine odor afforded by the use of beta-amino nitrile catalyst in combination with bis[2-(N,N-dimethylamino)ethyl]ether in forming free-rise flexible polyether foam and high-resilience molded foam is realized without impairment of foam quanlity or catalytic activity.

What is claimed is:

1. A catalyst combination for polyurethane formation which comprises component (1) and component (2) wherein component (1) is 3-(N,N-dimethylamino)propionitrile, and component (2) is at least one of dimethylethanolamine and bis[2-(N,N-dimethylamino)ethyl]ether and wherein:
   i. when component (2) is dimethylethanolamine, the said dimethylethanolamine is present in an amount of at least one and not more than 50 weight percent, based on the weight of component (1) and dimethylethanolamine; and
   ii. when component (2) is bis[2-(N,N-dimethylamino)ethyl]ether, said bis-ether is present in an amount of at least one and not more than 25 weight percent, based on the combined weight of component (1) and said bis-ether.

2. A catalyst combination for polyurethane formation which comprises (1) 3-(N,N-dimethylamino)propionitrile and (2) dimethylethanolamine, said dimethylethanolamine being present in an amount of at least one and not more than 40 weight percent, based on the combined weight of (1) and (2).

3. A catalyst combination for polyurethane formation which comprises (1) 3-(N,N-dimethylamino)poropionitrile and (2) bis[2-(N,N-dimethylamino)ethyl]ether, said bis-ether being present in an amount from one to 25 weight percent, based on the combined weight of (1) and (2).

4. A catalyst combination as defined in claim 3 in which said bis-ether is present in amount substantially not in excess of about 10 weight percent.

* * * * *

UNITED STATES PATENT OFFICE
CERTIFICATE OF CORRECTION

Patent No. 4,038,210   Dated July 26, 1977

Inventor(s)   Walter R. Rosemund et al.   Page 1 of 3

It is certified that error appears in the above-identified patent and that said Letters Patent are hereby corrected as shown below:

In the ABSTRACT, line 5 thereof, for "tamino" read -- t-amino --. Column 1, line 11, for "cyanosubstituted" read -- cyano-substituted --. Column 2, line 6, for "highresilience" read -- high-resilience --; line 64, for "urethaneforming" read -- urethane-forming --. Column 3, line 10, for "hereto" read -- hetero --; line 53, for "nitrogenbearing" read -- nitrogen-bearing --; line 57, for "betaamino" read -- beta-amino --. Column 4, line 65, for "form" read -- from --. Column 5, line 43, for "betahalonitrile" read -- beta-halonitrile --. Column 7, lines 15-18, the second formula reading $$\begin{array}{c} CH-C-CN \\ | \quad | \\ R_3 \; R_4 \end{array} \quad \text{should read} \quad \begin{array}{c} CH=C-CN \\ | \quad | \\ R_3 \; R_4 \end{array}$$

Column 7, line 40, for "betaun-" read -- beta-un- --. Column 8, line 5, for "proceeed" read -- proceed --. Column 11, line 65, for "on" read -- in --. Column 12, line 4, for "perioxides" read -- peroxides --. Column 13, lines 27 and 37, in both occurrences, for "highresilience" read -- high-resilience --; line 43, for "nubmers" read -- numbers --. Column 14, line 9, for "mononmer" read -- monomer --. Column 16, line 6, for "combinations" read -- combination --; line 22, for "N-)2" read -- N-(2 --. Column 19, lines 36-43, beginning with "a fluorocarbon" on line 36 through "art" on line 43, delete entirely. Column 21, line 63, for "descirbed" read -- described --; line 67, for "an" read -- and --. Column 22, line 64, for "polyolbased" read -- polyol-based --. Column 23, line 21, for "an" read -- and --. Column 25, line 11, for "foams" read -- foam --. Column 26, line 35, for "know" read -- known --. Column 28, line 6, after "for" read -- a --; line 11, after "6" read -- inch --; line 17, after the second

UNITED STATES PATENT OFFICE
CERTIFICATE OF CORRECTION

Patent No. 4,038,210  Dated July 26, 1977

Inventor(s) Walter R. Rosemund et al.  Page 2 of 3

It is certified that error appears in the above-identified patent and that said Letters Patent are hereby corrected as shown below:

occurrence of "15" and before the parenthesis mark ")", read -- inches --; line 63, after the third occurrence of "12", read -- inch --. Column 29, line 1, for "hennecke" read -- Hennecke --; line 14, for "measurement" read -- measurements --; line 18, after "1/2" and before the parenthesis mark ")", read -- inches --; line 20, for "(2-1/2 I.D.)" read -- (2-1/4 inches I.D.) --; line 22, for "(1/2)" read -- (1/2 inch ) --; line 35, after "1" read -- inch --. Column 30, line 20, for "mixture" read -- mixtures --. Columns 31-32, Table II-continued, opposite the left-hand legend reading "Tear Resistance", under column headed "2", for "2.20" read -- — --, under column headed "3", for "2.32" read -- 2.20 --, under column headed "4", for "2.67" read -- 2.32 --, under column headed "5", for "2.31" read -- 2.67 --, under column headed "6", for "2.64" read -- 2.31 --, and under column headed "7", read -- 2.64 --. Columns 31-32, Table II-continued, in footnote /1/, for "d-" read -- 3- --. Column 34, line 4, for "formulation" read -- formulations --; line 5, for "mixture" read -- mixtures --; line 48, for "19Upon" read -- 19). Upon --; line 50, for "has" read -- had --. Column 35, line 55, for "poly-based" read -- polyol-based --. Columns 37-38, Table XI, opposite the left-hand legend reading "Activator Solubility", under each of columns headed "K-6", "K-7", "K-8", "26", "27", "29", "30", "31" and "32", read -- Clear --. Column 41, line 34, for "EXAMPLS" read -- EXAMPLES --. Column 42, line 19, for "higly" read -- highly --. Columns 41-42, Table XV, opposite the left-hand legend reading "Foam Formulation" and between columns headed "K-9" and "37", delete "G", and under said columns headed "K-9" and "37" in each instance, read -- G --; Table XV, opposite the left-hand legend reading "Foam Formulation" and between columns headed "39" and "K-11", delete "H" and under columns headed "K-10", "38", "39", "K-11", "C-3",

UNITED STATES PATENT OFFICE
CERTIFICATE OF CORRECTION

Patent No. 4,038,210    Dated July 26, 1977

Inventor(s) Walter R. Rosemund et al.    Page 3 of 3

It is certified that error appears in the above-identified patent and that said Letters Patent are hereby corrected as shown below:

and "40", in each instance, read -- H --. Columns 43-44, Table XVI, the first eight entries listed under column headed "K-13", should also be read under each of columns headed "K-12", "41", "42" and "43"; Table XVI, the first eight entries listed between columns headed "44" and "45" should instead be read under each of columns headed "K-14", "44", "45" and "46". Column 45, line 15, for "CatalystI" read -- Catalyst I --. Columns 45-46, Table XIX, opposite the left-hand legend reading "Cells per Inch" and under column headed "K-15", for "25-40" read -- 35-40 --. Column 47, line 22, after "2.5" read -- inch --. Columns 47-48, Table XX, opposite the left-hand legend reading "Foam Formulation", the entry "A /1/" should also be read under columns headed "K-17" and "54", the entry "B /2/" shown between columns headed "K-18" and "55" should be read under each of said columns headed "K-18" and "55", and the entry "C /3/" should also be read under columns headed "K-19" and "57". Column 48, line 1, for "quanlity" read -- quality --; line 42, for "3-(N,N-dimethylamino)poropioni-" read -- 3-(N,N-dimethylamino)propioni- --; line 48, before "amount" read -- an --.

Signed and Sealed this

Twenty-second Day of November 1977

[SEAL]

Attest:

RUTH C. MASON
*Attesting Officer*

LUTRELLE F. PARKER
*Acting Commissioner of Patents and Trademarks*